United States Patent
Martin et al.

(10) Patent No.: US 10,200,251 B2
(45) Date of Patent: Feb. 5, 2019

(54) METHODS AND APPARATUS FOR ACCESSING SELECTABLE APPLICATION PROCESSING OF DATA PACKETS IN AN ADAPTIVE PRIVATE NETWORK

(71) Applicant: Talari Networks Incorporated, San Jose, CA (US)

(72) Inventors: Todd Martin, Campbell, CA (US); Yoogin Lean, Apex, NC (US); Justin Allen Patterson, Morrisville, NC (US)

(73) Assignee: TALARI NETWORKS, INC., San Jose, CA (US)

( * ) Notice: Subject to any disclaimer, the term of this patent is extended or adjusted under 35 U.S.C. 154(b) by 181 days.

(21) Appl. No.: 15/409,006

(22) Filed: Jan. 18, 2017

(65) Prior Publication Data

US 2017/0207997 A1    Jul. 20, 2017

Related U.S. Application Data

(60) Provisional application No. 62/280,448, filed on Jan. 19, 2016, provisional application No. 62/280,356, (Continued)

(51) Int. Cl.
*H04L 12/24* (2006.01)
*H04L 12/26* (2006.01)
(Continued)

(52) U.S. Cl.
CPC ........ *H04L 41/0896* (2013.01); *H04L 41/083* (2013.01); *H04L 41/0813* (2013.01); *H04L 41/12* (2013.01); *H04L 43/08* (2013.01); *H04L 43/106* (2013.01); *H04L 45/02* (2013.01); *H04L 45/22* (2013.01); *H04L 45/48* (2013.01); *H04L 45/54* (2013.01); *H04L 45/7453* (2013.01); *H04L 47/125* (2013.01); *H04L 49/3063* (2013.01); *H04L 61/6022* (2013.01);
(Continued)

(58) Field of Classification Search
CPC ...................................................... H04L 45/02
USPC ........................................................ 370/392
See application file for complete search history.

(56) References Cited

U.S. PATENT DOCUMENTS 7,215,637 B1 * 5/2007 Ferguson ................ H04L 45/00
370/230.1
7,568,047 B1 * 7/2009 Aysan ..................... H04L 45/02
370/352

(Continued)

Primary Examiner — Shripal K Khajuria
(74) Attorney, Agent, or Firm — Jenkins, Wilson, Taylor, & Hunt P.A.

(57) ABSTRACT

System and techniques are described for applying selectable applications to process data packets an adaptive private network (APN). Methods to select application specific processing within a WAN ingress processing pipeline begin with receiving a packet from a local area network (LAN) in an adaptive private network (APN) WAN ingress processing stages. The received packet is identified to be separately processed by a selected application that is different than standard ingress processing. Packet processing flow is redirected to the selected application for application specific processing of the received packet in response to the packet being identified to be separately processed. The separately processed packet is returned to the standard ingress processing after completing the separate processing.

24 Claims, 8 Drawing Sheets

Related U.S. Application Data filed on Jan. 19, 2016, provisional application No. 62/280,381, filed on Jan. 19, 2016, provisional application No. 62/371,998, filed on Aug. 8, 2016, provisional application No. 62/372,021, filed on Aug. 8, 2016.

(51) Int. Cl.

| | | |
|---|---|---|
| *H04L 12/751* | (2013.01) | |
| *H04L 12/753* | (2013.01) | |
| *H04L 12/803* | (2013.01) | |
| *H04M 1/725* | (2006.01) | |
| *H04L 12/741* | (2013.01) | |
| *H04L 12/743* | (2013.01) | |
| *H04L 12/935* | (2013.01) | |
| *H04L 29/12* | (2006.01) | |
| *H04L 12/707* | (2013.01) | |

(52) U.S. Cl.
CPC ..... *H04M 1/72519* (2013.01); *H04L 43/0829* (2013.01); *H04L 43/0876* (2013.01); *H04L 43/0888* (2013.01); *H04L 43/0894* (2013.01); *H04L 43/10* (2013.01); *H04L 43/16* (2013.01); *H04L 43/50* (2013.01)

(56) References Cited

U.S. PATENT DOCUMENTS

| | | | |
|---|---|---|---|
| 8,125,907 B2 * | 2/2012 | Averi | H04L 45/00 370/232 |
| 8,274,891 B2 | 9/2012 | Averi et al. | |
| 8,452,846 B2 | 5/2013 | Fredette et al. | |
| 8,644,164 B2 | 2/2014 | Averi et al. | |
| 8,775,547 B2 | 7/2014 | Fredette et al. | |
| 9,069,727 B2 | 6/2015 | Martin et al. | |
| 9,100,338 B2 | 8/2015 | Averi et al. | |
| 9,392,061 B2 | 7/2016 | Fredette et al. | |
| 2013/0343181 A1 * | 12/2013 | Stroud | H04L 43/50 370/229 |
| 2013/0343390 A1 * | 12/2013 | Moriarty | H04L 43/0852 370/392 |
| 2015/0071067 A1 * | 3/2015 | Martin | G06F 11/2002 370/235 |
| 2016/0072706 A1 | 3/2016 | Huang et al. | |
| 2016/0179850 A1 | 6/2016 | Martin et al. | |
| 2016/0182305 A1 | 6/2016 | Martin et al. | |
| 2016/0182319 A1 | 6/2016 | Martin et al. | |
| 2016/0182327 A1 | 6/2016 | Coleman, Jr. et al. | |
| 2016/0197802 A1 | 7/2016 | Schultz et al. | |

* cited by examiner

METHODS AND APPARATUS FOR ACCESSING SELECTABLE APPLICATION PROCESSING OF DATA PACKETS IN AN ADAPTIVE PRIVATE NETWORK

The present application claims the benefit of U.S. Provisional Patent Application Ser. No. 62/280,448 titled "Methods and Apparatus for Accessing Selectable Application Processing of Data Packets in an Adaptive Private Network" filed Jan. 19, 2016; U.S. Provisional Patent Application Ser. No. 62/280,356 titled "Methods and Apparatus for Configuring a Standby WAN link in an Adaptive Private Network" filed Jan. 19, 2016; U.S. Provisional Patent Application Ser. No. 62/280,381 titled "Methods and Apparatus for Accessing Dynamic Routing Information from Networks Coupled to a Wide Area Network (WAN) to Determine Optimized End-to-End Routing Paths" filed on Jan. 19, 2016; U.S. Provisional Patent Application Ser. No. 62/371,998 titled "Applications and Integrated Firewall Design in an Adaptive Private Network (APN)" filed Aug. 8, 2016; and U.S. Provisional Patent Application Ser. No. 62/372,021 titled "Adaptive Private Network (APN) Bandwidth Enhancements" filed Aug. 8, 2016 which are incorporated by reference herein in their entirety.

CROSS REFERENCE TO RELATED APPLICATIONS

The present application is also related to U.S. patent application Ser. No. 14/146,786 filed on Jan. 3, 2014 which issued as U.S. Pat. No. 9,100,338 entitled "Flow-Based Adaptive Private Network With Multiple Wan-Paths", which is a divisional of U.S. patent application Ser. No. 13/592,460 filed on Aug. 23, 2012 which issued as U.S. Pat. No. 8,644,164 entitled "Flow-Based Adaptive Private Network With Multiple WAN-Paths", which is a continuation of U.S. patent application Ser. No. 13/353,693 filed on Jan. 19, 2012 which issued as U.S. Pat. No. 8,274,891 entitled "Flow-Based Adaptive Private Network With Multiple WAN-Paths", which is a continuation of U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which issued as U.S. Pat. No. 9,392,061 entitled "Adaptive Private Network Asynchronous Distributed Shared Memory Services", which is a continuation of U.S. patent application Ser. No. 13/850,411 filed on Mar. 26, 2013 which issued as U.S. Pat. No. 8,775,547 entitled "Adaptive Private Network Asynchronous Distributed Shared Memory Services", and which is a continuation of U.S. patent application Ser. No. 13/208,825 filed on Aug. 12, 2011 which issued as U.S. Pat. No. 8,452,846 entitled "Adaptive Private Network Asynchronous Distributed Shared Memory Services", all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 which issued as U.S. Pat. No. 9,069,727 entitled "An Adaptive Private Network with Geographically Redundant Network Control Nodes"; U.S. patent application Ser. No. 14/019,723 filed on Sep. 6, 2013 and published as U.S. Patent Application No. 2015-0071067 A1 entitled "An Adaptive Private Network with Path Maximum Transmission Unit (MTU) Discovery Process"; U.S. patent application Ser. No. 14/481,335 filed on Sep. 9, 2014 and published as U.S. Patent Application No. 2016-0072706 A1 entitled "Adaptive Private Network with Dynamic Conduit Process"; U.S. patent application Ser. No. 14/972,270 filed on Dec. 17, 2015 and published as U.S. Patent Application No. 2016-0182305 A1 entitled "Methods and Apparatus for Providing Adaptive Private Network Centralized Management System Discovery Processes"; U.S. patent application Ser. No. 14/972,353 filed on Dec. 17, 2015 and published as U.S. Patent Application No. 2016-0182319 A1 entitled "Methods and Apparatus for Providing Adaptive Private Network Centralized Management System Timestamp Correlation Processes"; U.S. patent application Ser. No. 14/972,514 filed on Dec. 17, 2015 and published as U.S. Patent Application No. 2016-0179850 A1 entitled "Methods and Apparatus for Providing Adaptive Private Network Database Schema Migration and Management Processes"; U.S. patent application Ser. No. 14/973,193 filed on Dec. 17, 2015 and published as U.S. Patent Application No. 2016-0182327 A1 entitled "Methods and Apparatus for Providing Adaptive Private Network Centralized Management System Data Visualization Processes"; U.S. patent application Ser. No. 14/973,343 filed on Dec. 17, 2015 and published as U.S. Patent Application No. 2016-0197802 A1 entitled "Methods and Apparatus for Providing Adaptive Private Network Centralized Management System Time Correlated Playback of Network Traffic"; U.S. patent application Ser. No. 15/409,001 filed on Jan. 18, 2017 entitled "Methods and Apparatus for Configuring a Standby WAN Link in an Adaptive Private Network"; U.S. patent application Ser. No. 15/409,016 filed on Jan. 18, 2017 entitled "Methods And Apparatus For Accessing Dynamic Routing Information From Networks Coupled To A Wide Area Network (WAN) To Determine Optimized End-To-End Routing Paths"; and U.S. patent application Ser. No. 15/409,019 filed on Jan. 18, 2017 entitled "Adaptive Private Network (APN) Bandwidth Enhancements", all of which have the same assignee as the present application, are related applications, and are hereby incorporated by reference in their entirety.

FIELD OF THE INVENTION

The present invention relates generally to improved network management and wide area network (WAN) optimizations. More specifically, the present invention relates to improved methods for applying selectable applications, such as compression, encryption, or the like, for processing of data packets in an adaptive private network (APN).

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LANs) allowing devices in one location to communicate with devices and their users in other locations. In a WAN having a large number of remote sites, connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

For example, site A is anticipated to have high bandwidth requirements for data transfer with site B and site C is anticipated to also have high bandwidth requirements for data transfer with site B. Since at the time the network is configured there may be little anticipated requirement for communication between site A and site C and since sites A and C can communicate to each other by going through site B, a communication path between sites A and C is not statically configured. With the network system operating over time, the original assumptions on communication paths likely to change. For example, sites A and C may require communication at a much higher bandwidth at this later time than is easily achieved by communicating through the intermediate site B thereby causing congestion on the paths between sites A and B and between sites B and C. A reconfiguration of the network is not usually feasible due to configuration overhead and lost time in operating the network. Also, different types of data packets require different types of compression applications to more optimally reduce packet size and improve network use of available bandwidth. Further, the dynamics of the network system may further change over time making repeated static configuration of the network inefficient and costly to implement. Further, static connections involve reservations of network resources. As data flow patterns change in the network, the reserved resources create non-optimal static connections which cause the network to reserve bandwidth that could be better used elsewhere in the network.

As networks become larger and more complex, administrative techniques for managing the network are increasingly more complex and costly. WAN virtualization and WAN application specific processing, such as use of optimization techniques, provide a plurality of applications associated with different data types and functions which if selectable would improve network operation and management. Prior techniques to separately configure, monitor, optimize according to data type and function, and analyze each node of a large network may not provide accurate information and are prone to errors.

SUMMARY OF THE INVENTION

Among its several aspects, the present invention recognizes a management technique is needed that provides more accurate and lower cost techniques to configure, monitor, and analyze a network, as well as to present related data in a user friendly manner. Among its several aspects, the present invention addresses systems and techniques which improve methods for applying selectable local or remote applications for processing of data packets in an adaptive private network (APN). To such ends, an embodiment of the invention applies a method for accessing selectable applications to provide selectable wide area network (WAN) specific processing within a WAN ingress processing pipeline. A packet is received from a local area network (LAN) in a WAN ingress processing pipeline of an adaptive private network (APN). The received packet is identified as one to be separately processed by a redirected application that provides different processing than standard ingress processing. Packet processing flow is redirected from an identified point in the WAN ingress processing pipeline to the redirected application for application specific processing of the received packet in response to the packet being identified as the one to be separately processed. The separately processed packet is returned from the redirected application to a point in the standard ingress processing following the identified point and after completing the separate processing.

Another embodiment of the invention addresses a method for accessing selectable applications to provide selectable wide area network (WAN) specific processing within a WAN egress processing pipeline. A packet is received from a wide area network (WAN) in a WAN egress processing pipeline of an adaptive private network (APN). The received packet is identified as one to be separately processed by a selected application that provides different processing than standard egress processing. Packet processing flow is redirected from an identified point in the WAN ingress processing pipeline to the redirected application for application specific processing of the received packet in response to the packet being identified as the one to be separately processed. The separately processed packet is returned from the redirected application to a point in standard egress processing following the identified point and after completing the separate processing.

A further embodiment of the invention addresses a computer readable non-transitory medium storing a program which causes a computer system to perform a method for accessing selectable applications to provide selectable wide area network (WAN) specific processing within a WAN ingress processing pipeline. A packet is received from a local area network (LAN) in a WAN ingress processing pipeline of an adaptive private network (APN). The received packet is identified as one to be separately processed by a redirected application that provides different processing than standard ingress processing. Packet processing flow is redirected from an identified point in the WAN ingress processing pipeline to the redirected application for application specific processing of the received packet in response to the packet being identified as the one to be separately processed. The separately processed packet is returned from the redirected application to a point in the standard ingress processing following the identified point and after completing the separate processing.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
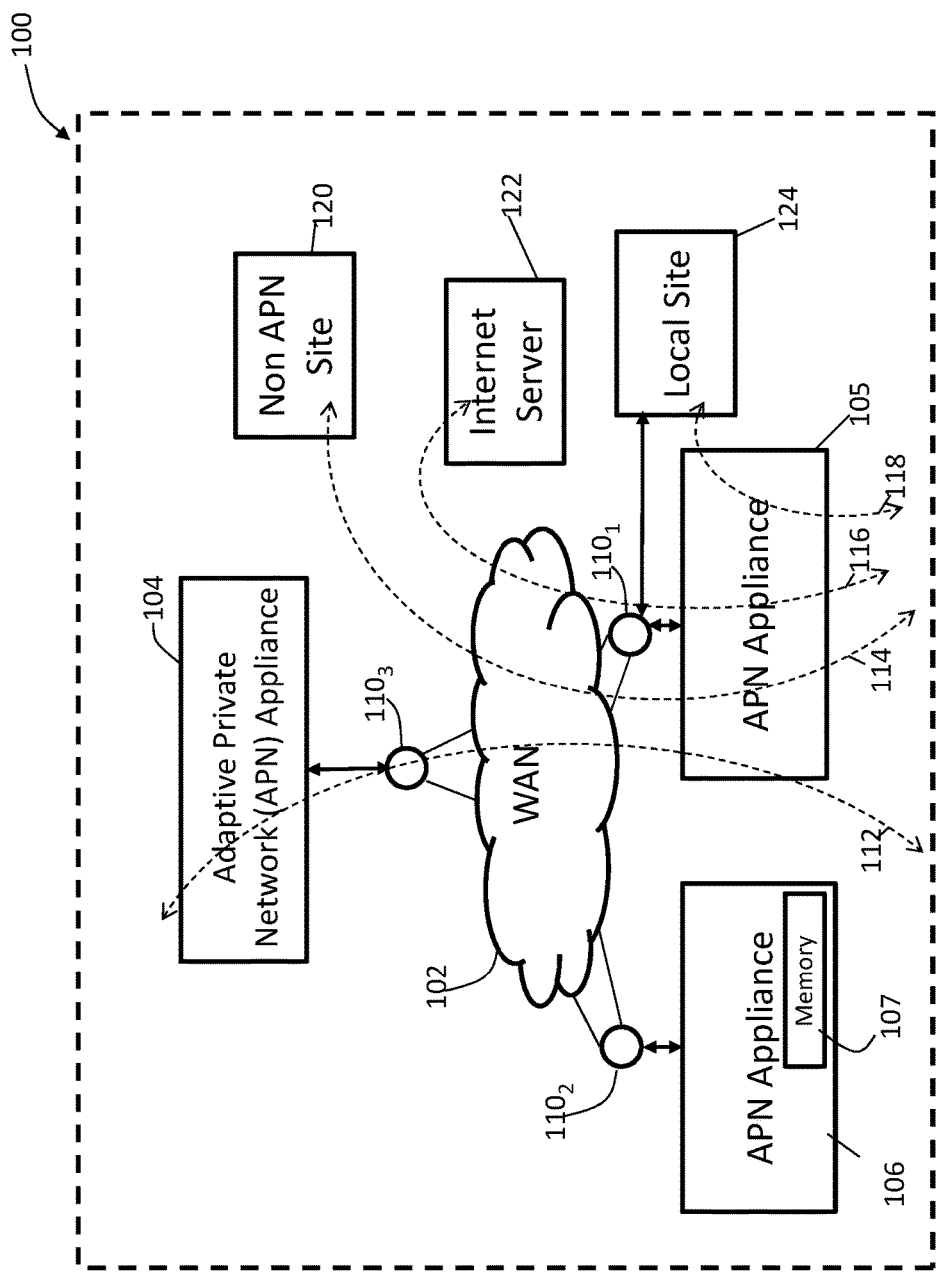
FIG. 1A illustrates an example of an adaptive private network (APN) with APN service paths in accordance with an embodiment of the present invention.

FIG. 1A illustrates an example of an adaptive private network (APN) 100 with APN service paths in accordance with an embodiment of the present invention. The APN 100 includes one or more wide area networks (WANs), such as WAN 102, APN appliances (APNAs) 104-106, WAN routers 110$_1$-110$_3$, and network application services as well as APN conduits between the APNAs, as described in more detail below. The APN is configured from a single APNA acting as a network control node (NCN) that provides a single point of control for the APN. First, however, a number of terms used herein are defined with the meaning they have when used in the context of the present invention.

An APN path, also referred to as a regular path, is a logical connection established between two WAN links located at different geographic sites across a WAN where one WAN link sends traffic to the other WAN link. Since Paths are unidirectional entities (one sender and one receiver), two WAN links that are connected to each other have two paths between them. Each WAN link sees one path as being its transmit path and the other as the receive path. A regular path is used to send user traffic under normal circumstances.

An APN conduit is a virtual connection between two APN nodes, also referred to as client sites, and formed by aggregating one or more APN paths and their allocated WAN link resources. A conduit service is a logical combination of one or more paths. A conduit service is typically used for enterprise site-to-site intranet traffic, utilizing the full value of the APN. With a conduit service, depending on configuration, traffic is managed across multiple WAN links to create an end-to-end tunnel. The conduits overlay a virtual network on top of the underlying network.

A conduit maximum transmission unit (MTU) is defined as a minimum link MTU of the one or more APN paths in the conduit between a source site and a destination site.

An APN appliance (APNA) is a device that contains APN client site functionality including software modules which governs its participation in an APN. A high availability (HA) site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers 110$_1$-110$_3$ of FIG. 1A.

A regular WAN link is a WAN link configured in an active mode, which is the default mode for the WAN link.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

An Internet service is used for traffic between an enterprise site and sites on the public Internet. Internet traffic is not encapsulated. During times of congestion, the APN manages bandwidth in the network by rate-limiting Internet traffic relative to traffic on a conduit taking into account the network configuration established by an administrator.

An intranet service is used for any portion of enterprise intranet traffic that has not been defined for transmission across a conduit. As with Internet traffic, the intranet traffic remains un-encapsulated, and the APN manages bandwidth in the network by rate-limiting the intranet traffic relative to other service types during times of congestion. Note that under certain conditions, and if configured for intranet fallback on the conduit, traffic that ordinarily travels via a conduit may instead be treated as intranet traffic in order to maintain network reliability. Since conduit traffic is site-to-site, customers generally have a way to deliver this site-to-site traffic without the conduit. This unencapsulated service, called an intranet service, does not receive the benefits of the conduit. If the conduit tunnel cannot be brought up, then routes which use that conduit are ignored and this means that traffic that would have used the conduit are redirected to use an unencapsulated site-to-site transport method.

A routing domain represents a segmentation of a network. Traffic can only flow within one routing domain, not across routing domains. Separate routing domains may be set up based on segmentation of traffic within an enterprise for security reasons, as when a guest network should be fully segmented from an employee network. In another example, separate routing domains may be set up based on segmentation of traffic within an enterprise for manageability reasons, as when a large corporation organizes its network into distinct routing domains. Also, traffic within a very small aperture terminal (VSAT) satellite network may be segmented into separate routing domains to support multiple tenants at a client site. In a further example, traffic may be segmented within a managed service provider network to separately support multiple customer networks.

A static conduit is a conduit configured in a configuration file and created at startup time of an APNA. A static conduit is not removed without changing the configuration file.

A dynamic conduit is a conduit created between APN clients when needed and which can be removed when no longer needed.

In one embodiment, one form of a software application is an abstraction to allow flows to be grouped together. A criterion that is used to group flows together may vary depending on the intended use. Some organizations may want to group all flows that interact with a company's web domain, such as a sales domain by use of a software sales application, while other organizations may want to view the software sales application as an Internet web browsing application that also includes access to other domains. For example, email is usually used extensively and is also generally considered very important, so it would be reasonable to view a product such as an email software manager as an application. In this scenario, the software sales application would include flows from an email software manager client as well as the email software manager web application web-page.

A WAN application (WANapp) virtual machine is an optimization device, such as a device that provides one or a plurality of selectable compression algorithms or one of a plurality of selectable encryption algorithms that are applied to communication traffic.

A web cache communication protocol (WCCP) is an exemplary protocol for use as described in more detail below. It is appreciated that an alternative protocol may be utilized having similar or different capabilities depending upon a particular software application of the embodiments described herein.

An APN service is a set of processing steps performed on packets that are transmitted through the APN. As illustrated in FIG. 1A, data traffic that moves through the APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit there exists a separate APN service instance for the APN conduit service type.

An APN conduit service associated with path 112 manages network traffic packets that are transmitted through the APN 100 from the APN appliance 105 through router 110$_1$, through the WAN 102, through another router 110$_3$ to APN appliance (APNA) 104. The APN conduit service for path 112 operates on both APN appliances 104 and 105. The APN conduit service sends and receives data between a first geographic location that has the APNA 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APNA 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has the APNA 105 and a local site 124 within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

A conduit comprises multiple paths. A path is formed between 2 WAN links associated with the conduit. Each path in each conduit in the APN is monitored for quality of communication by collecting quality metrics such as packet loss and latency. This monitoring is done by way of control messages and is done on each path whether the path is used to transmit user traffic or not. Accordingly, no path is completely free of traffic unless it is not operational. Since all paths within a conduit are being measured whether there is user traffic through the path or not, the conduit maintains up to date per-path metrics that are used by the APN to select the best network path to transmit user data.

Dynamic conduits address changes in statically configured networks that are not just slow, gradual changes in network usage, but are happening in real time throughout a day across a network which may be global. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. The centralized management system also includes capabilities that provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps that show nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package comprises the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a "project" in a software integrated development environment (IDE) which collects a set of source code files and associated build scripts and resources such as help text and images to create a complex graphical application.

WAN virtualization, as described herein, enables multiple WAN connections to replace individual private WAN connections, such as Internet WAN links, and perform bandwidth aggregation with improved performance while minimizing impact of WAN links with different or changing latency, jitter, and packet loss metrics.

WAN optimization, as described herein, generally utilizes compression, caching, and other techniques to improve data transfers across a network.

A flow is defined by an n-tuple comprising of <IP source address, IP destination address, IP protocol number, transmission control protocol (TCP)/user datagram protocol (UDP) source port, if the IP protocol is TCP or UDP, TCP/UDP destination port, if the IP protocol is TCP or UDP>. Depending on the context, other items could be added to the tuple including: a differentiated services code port (DSCP) tag, a routing domain, a service identifier, and the like. Also, a flow is unidirectional. For example, if nodes A and B are communicating, there is a flow that represents traffic from A to B and a flow representing traffic from B to A.

Figure 1B:
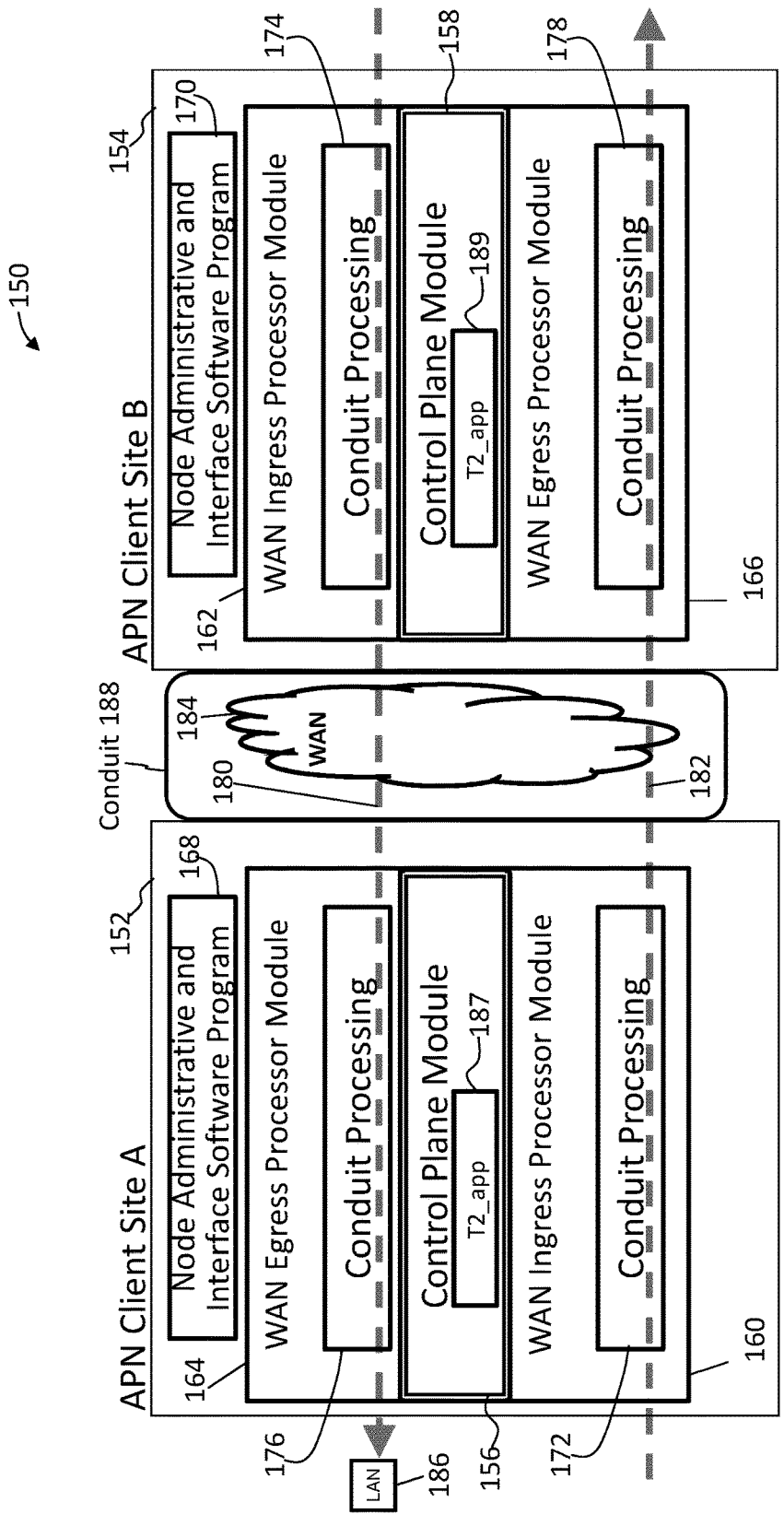
FIG. 1B illustrates an adaptive private network (APN) conduit two-ended service system between a client site A and a client site B in accordance with an embodiment of the present invention.

FIG. 1B illustrates an adaptive private network (APN) conduit two-ended service system 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include duplicate conduit services 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of one APN client site's WAN ingress conduit processing 174 to the peer APN client site's WAN egress conduit service processing 176 constitutes an APN conduit 188 in which traffic is actively monitored and managed across multiple WAN resources. The t2_apps 187 and 189 are control programs that run on each APNA communicating with other APNAs in the APN while forwarding user data.

The APN is capable of using disparate asymmetric WAN links which frequently vary in behavior with respect to bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN Ingress Module 160, FIG. 1B.

Figure 1C:
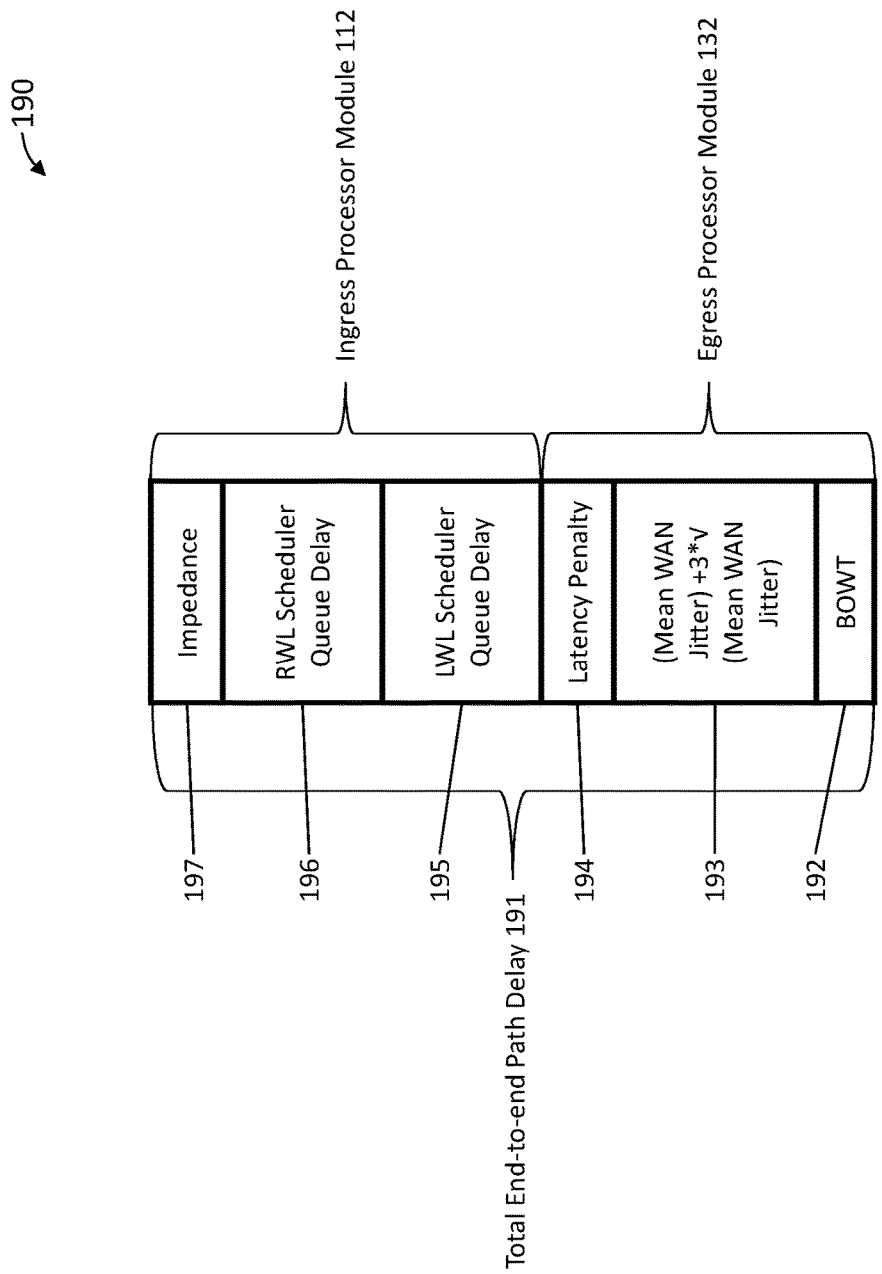
FIG. 1C illustrates exemplary factors used to determine the total end-to-end path delay in accordance with an embodiment of the present invention.

FIG. 1C illustrates exemplary factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link schedulers' queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$(mean WAN jitter 193))+latency penalty 194+local WAN link (LWL) scheduler queue delay 195+remote WAN link (RWL) scheduler queue delay 196+impedance 197. The BOWT 192, mean WAN jitter 193, and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in parallel a control plane module's path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a Nag method, as provided by a Nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form $y=mx+b$ is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane module's path state monitoring service is used to detect packet loss and optimal paths for traffic to use across the APN. The result is an ability to detect a difference between occasional incidental short term network loss and long term persistent problems.

In a presently preferred embodiment, the APN node's software modules at a client site are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as utilized in an adaptive private network (APN) appliance (APNA), a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules supporting participation in an adaptive private network. An APN node may exist in one or more APN appliances at a location. An APN node contains a collection of software modules executed by a processor and memory complex located in the APN node which govern the APN node's participation within an APN such as control plane modules 156 and 158, WAN ingress processor modules 160 and 162, and WAN egress processor modules 164 and 166 in FIG. 1B. The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP) packets, that are utilized as part of change management software or through administrative interfaces, such as downloading software using interfaces 168 and 170 to the APN client sites. The TAP is a protocol for messages that are sent through the WAN to allow processes outside of t2_app on different appliances to communicate with each other. TAP can be considered to operate as a point-to-point or Ethernet like device which, instead of receiving packets from physical media, receives the packets from a user program and instead of sending packets via the physical media, writes the packets to the user program. The t2_apps 187 and 189 of FIG. 1B are control programs that run on each APNA communicating with other APNAs in the APN while forwarding user data. After a software update, the APN services on the APN client sites 152 and 154 are then restarted thus bringing the APN software node configuration into synchronization.

Figure 2A:
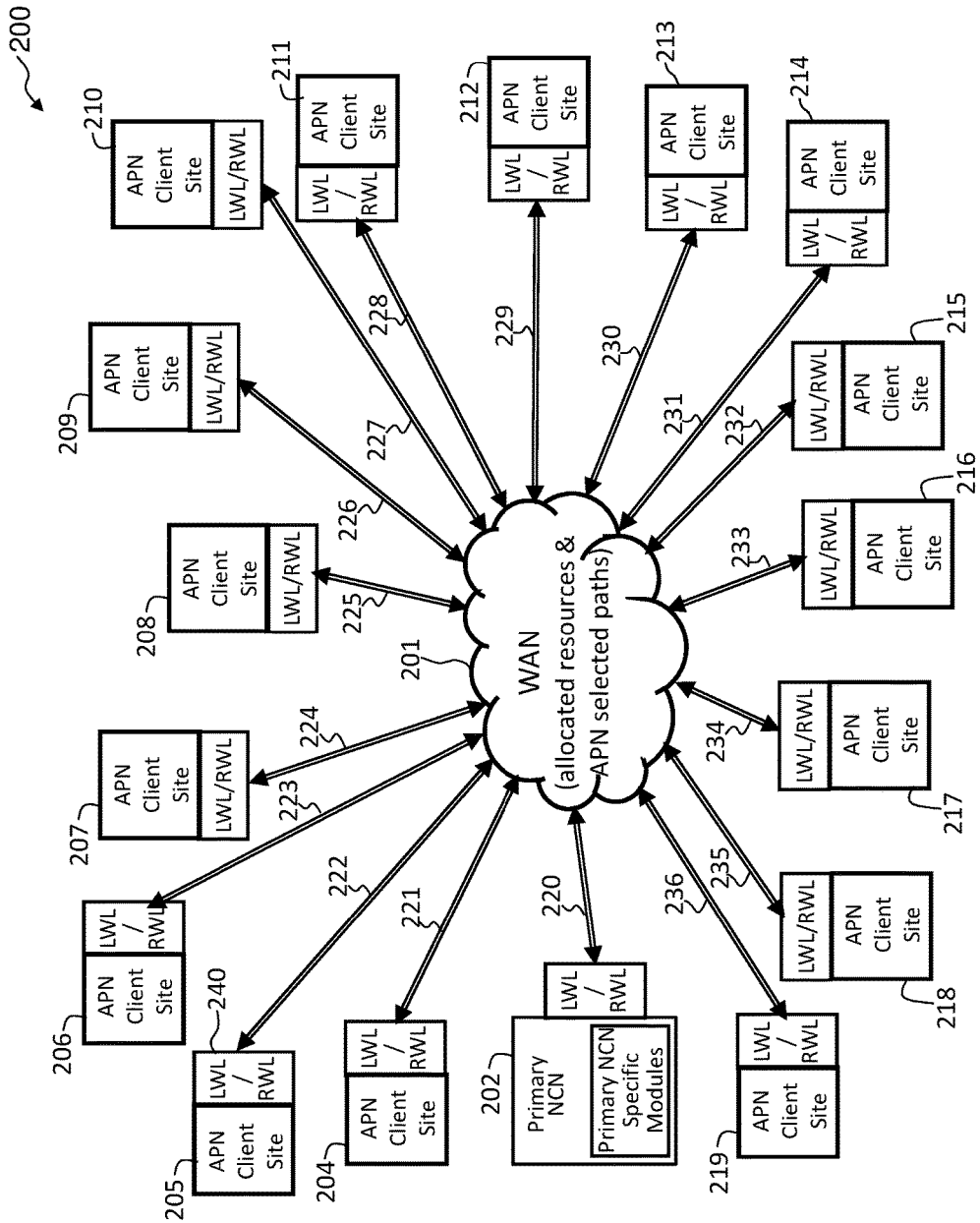
FIG. 2A illustrates an APN having an APN network control node (NCN) and sixteen APN conduits coupled to sixteen APN client sites in accordance with an embodiment of the present invention.

FIG. 2A illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2A, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2A, a conduit between a site A and a site B is formed by use of the conduit sections 222 and 225 and is a virtual connection between the corresponding site A and site B. The conduit includes a collection of paths and encompasses a path from a local WAN link (LWL) at site A→"WAN"→RWL at site B.

In one presently preferred embodiment, APN conduits exist between the NCN and, for example, sixteen APN client sites as shown in FIG. 2A. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

The sixteen client sites 204-219 of the exemplary APN 200 are generally located remotely from each other and may include geographically diverse client sites. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane modules 156 and 158, the WAN ingress processor modules 160 and 162, and the WAN egress processor modules 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A network control point (NCP) 202 of FIG. 2 is an administration point for the APN 200. In one embodiment, the NCP 202 resides within an APN node. An APN control node refers to an APN node that also performs as the network control point of the APN. In another embodiment, an NCP resides in an appliance that is separate from an APN node and administers and controls the APN nodes within the APN. The NCP provides administrative and control functions to the APN, including but not limited to, distribution of configuration objects to APN client nodes and time synchronization to the APN.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes the configured second threshold, creation of a dynamic conduit can be triggered. The first and second thresholds refer to bandwidth levels passing through an intermediate site.

Software code referenced as t2_app provides processes that forward data traffic and control protocols related to conduits. The t2_app software is described in further detail below and shown as element 290 in FIG. 2B and element 422 in FIG. 4. The t2_app code currently comprises five directories: control, forward, manage, platform_api, and common, though not limited to this number of directories. The control directory holds the code related to the control protocols used by t2_app for conduits. The forward directory contains the code that is responsible for moving packets through the system. The manage directory has code that deals with the management plane. The platform_api code is responsible for interfacing with the hardware and the common directory has code which is not specific to any of the other directories.

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes and service rules that the APN traffic flow matches. The state of APN flow record includes, but is not limited to, APN service type, APN service instance, information pertaining to the last APN path selected, current APN flow sequence number, time of last packet received, time of last packet transmitted, counts of number of packets and number of bytes processed, sets of pending packets for sequence reordering, sets of pending packets for fragmentation, and sets of historical records for packets previously processed.

The control directory includes code associated with an APN memory subsystem, which is a distributed shared memory system that allows a data structure on one appliance to be pushed over a conduit to an appliance on another site. A conduit path manager deals with sending and receiving transmission quality reports (TQRs) between sites. The TQRs are sent using the APN memory subsystem. A geographically diverse process handles a state machine controlling primary and secondary standby NCNs in geographically diverse regions. The t2_app also handles control of flows in the system. The flows are stored in a hash table and references are counted so that it is known when it is safe to free a flow data structure. As packets are passed through t2_app, they hold a pointer to the flow so flows are not freed until it is known that there are no more users of that flow in the system.

For a conduit to work properly, it is important that both ends of the conduit have the same notion of time. The t2_app provides a time synchronization protocol that is implemented in each node of the APN system. The t2_app also provides a process for tracking of traffic usage on a WAN link. In particular, this tracking process includes a task that wakes up every 100 ms, for example, and examines the current allocation of bandwidth on a WAN link and compares it to the actual usage. The data provided by this tracking process allows the bandwidth to be adjusted regularly so that demand can be met. The t2_app also implements a versioning protocol that sites use to make sure they are compatible before bringing up a conduit. This protocol is leveraged to do a key exchange and to rotate encryption keys while the conduit is in operation. The t2_app also implements a high availability (HA) protocol between two appliances serving a site. Various operations use customizable rules which are processed by the t2_app. Further, the t2_app also processes routes by using a route cache so that once a route has been looked up and determined and stored in the route cache, the t2_app utilizes a hash based lookup to search for the route and associated information in the route cache. In one embodiment, route caches are local to a thread so that locking does not need to be done, resulting in fast route lookups. A version number is kept on a main route database and incremented anytime a change is made to the route table. This allows threads to detect when their route cache has data that is out of date.

The manage directory provides for processes in the APNA supporting sending of commands to the t2_app to perform actions or retrieve information. These actions can include enabling or disabling paths or conduits, pinging an address, or notifications about changes to the system made by the management tools, and the like. A rich debug interface to t2_app is also provided. The t2_app also provides a way for applications external to the t2_app to send commands to a remote site through the conduit, which is used, for example by change management processes. The t2_app provides support for the NCN to distribute learned public IP addresses to other sites to enable client to client conduit communications when both clients are behind a network address translation (NAT) and the public IP address is not known in advance. This mechanism uses the APN memory subsystem to distribute the messages. The t2_app further supports client operations to inform the NCN of their management IP address. This approach allows a user interface on the NCN to provide links to navigate to a client appliance. This approach also allows an APN VM system to discover the management IP addresses of all appliances in the network when it communicates with the NCN.

Figure 2B:
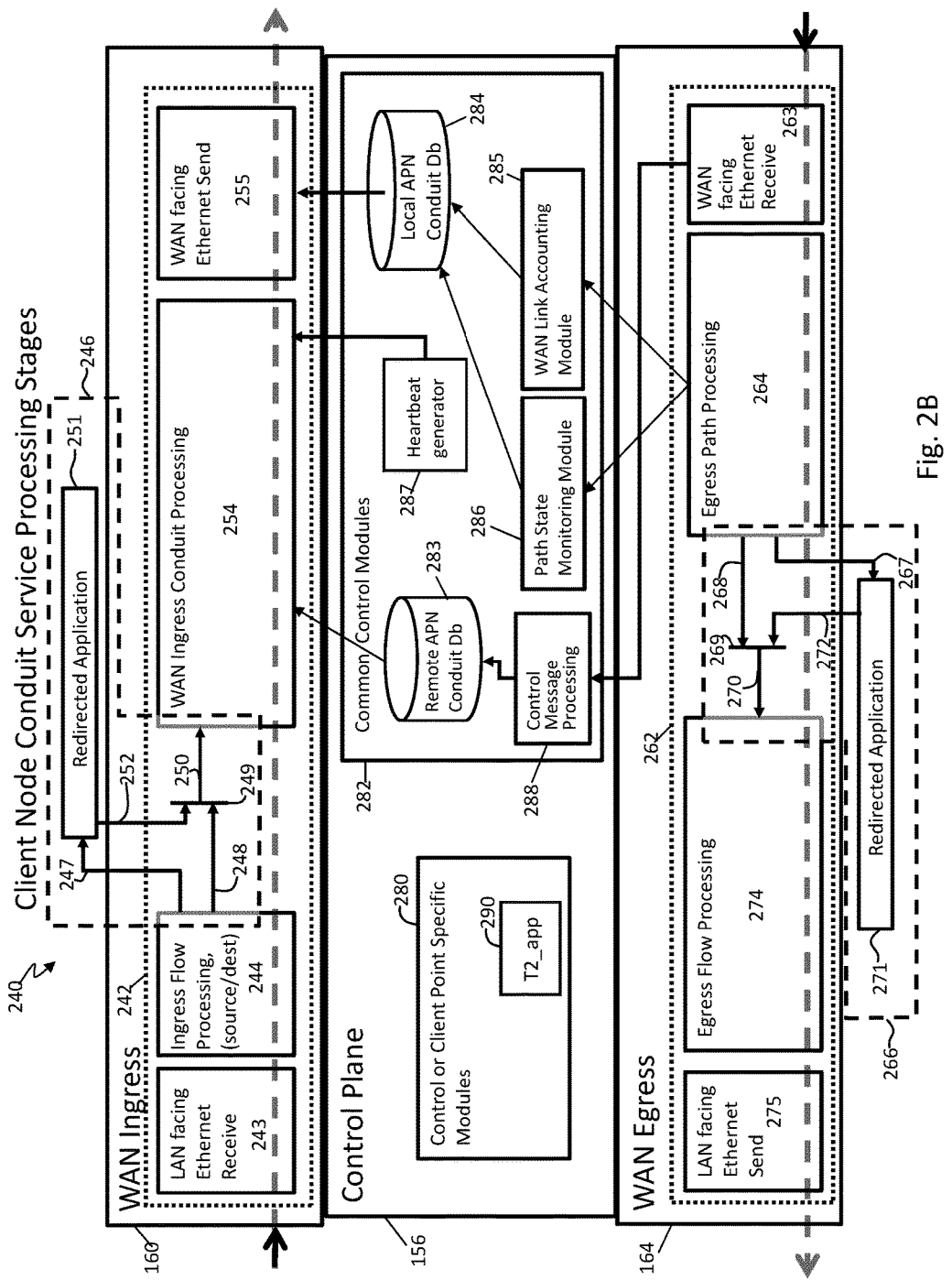
FIG. 2B illustrates APN conduit processing stages including insertion of selectable application processing of data packets in accordance with an embodiment of the present invention.

The t2_app 290 of FIG. 2B is configured according to a multi-threaded pipeline model, wherein each stage of processing is accomplished in a separate thread. The threads hand off packets to each other through queues. The multi-threaded architecture of t2_app 290 allows a software platform on an APNA with multiple CPUs to spread the processing of a packet across the multiple CPUs, which allows performance of the t2_app to scale as more CPUs are made available.

As illustrated in FIG. 2B, operation of a control or client-point specific module 280 is determined by the role of the APN node within the APN. If the APN node is an APN network control node, the module serves as the APN control point. If the APN node is an APN client, the module serves as the APN client point. All APN nodes have the common control modules 282. These common control modules 282 provide services that are universal to all APN nodes.

An APN node's common control modules 282 is responsible for tracking and adjusting the behavior of the APN continually. In particular, the common control modules 282 contains specific modules associated with APN paths and WAN links. As illustrated in FIG. 2B, the path state monitoring module 286 is responsible for the empirical monitoring of the APN paths' performance. The WAN link accounting module 285 is responsible for the empirical monitoring of the WAN links' performance for bandwidth, congestion, and determines dynamic allocation of WAN resources for network services utilizing the WAN links.

An APN node communicates results derived by the common control modules 282 through the use of the local APN conduit state selected from the local APN conduit database (Db) 284, and the remote APN conduit state selected from the remote APN conduit database (Db) 283. The local APN conduit state is contained in memory on the APN appliance, and is written to by the common control modules local to the APN node. When the local APN conduit state is updated, the local APN conduit state data is transmitted to remote APN nodes with an APN quality report packet. The APN quality report is transmitted via the local APN node's WAN ingress processor module 160 and is received by the remote APN nodes' WAN egress processor module 164. The remote APN nodes update their remote APN conduit state with data contained within the APN quality report. The remote APN conduit state is then referenced by the APN node's WAN ingress processor modules and WAN egress processor modules in order to determine the proper adaptive behaviors for data to be sent to or received from the WAN.

A network control node (NCN) 202 of FIG. 2A is an administration point for the APN 200. In one embodiment, the NCN 202 resides within an APN node. An APN control node refers to an APN node that also performs as the network control point of the APN. In another embodiment, an NCN resides in an appliance that is separate from an APN node and administers and controls the APN nodes within the APN. The NCN provides administrative and control to the APN, including but not limited to, distribution of configuration objects to APN client nodes and time synchronization to the APN.

FIG. 2B illustrates egress conduit service processing stages 262 and ingress conduit service processing stages 242. The WAN ingress conduit service processing stages 242 include LAN-facing Ethernet receive stage 243, ingress flow processing stage 244, WAN ingress redirect application processing stage 246, WAN ingress conduit processing stage 254, and WAN-facing Ethernet send stage 255. The WAN egress conduit service processing stages 262 include WAN-facing Ethernet receive stage 263, egress path processing stage 264, WAN egress redirect application processing stage 266, egress flow processing stage 274, and LAN-facing Ethernet send stage 275.

LAN-facing Ethernet receive stage 243 and WAN-facing Ethernet receive stage 263 are responsible for receiving data packets from their respective Ethernet interfaces of the APN appliance. These stages allocate memory buffers from an APN node's memory buffer pool and store the data packets to the memory buffers. WAN-facing Ethernet receive stage 263 also performs decryption services for APN conduit traffic.

LAN-facing Ethernet send stage 275 and WAN-facing Ethernet send stage 255 are responsible for transmitting data packets to their respective APN appliance Ethernet interfaces. These stages free the allocated memory buffers after the packets have been transmitted. WAN-facing Ethernet send stage 255 also performs encryption services to APN conduit traffic.

The egress flow processing stage 274 and ingress flow processing stage 244 are responsible for the APN flow processing. For purposes of discussion herein, a network session is defined as a set of traffic that is managed as a unit for processing by an APN. This session definition is a direct mapping to RFC2663, section 2.3 definition of a session for network address translation, which states, "TCP/UDP sessions are uniquely identified by the tuple of (source IP address, source TCP/UDP port, target IP address, target TCP/UDP port). ICMP query sessions are identified by the tuple of (source IP address, ICMP query ID, target IP address). All other sessions are characterized by the tuple of (source IP address, target IP address, IP protocol)."

An APN traffic flow is the administrator designation for network session traffic that is identified to a particular APN flow record. APN traffic flow requirements are administrator-configured requirements that govern an intended behavior of an APN as it pertains to an APN traffic flow. For example, APN traffic flow requirements may comprise a persistent path flow requirement, a duplication flow requirement, and a reliable flow requirement.

An APN flow record is held in the memory of an APN appliance. An APN flow record tracks a defined APN traffic flow, ensuring that the APN traffic flow's prior-configured requirements are followed. The APN flow record contains both the APN traffic flow requirements and the APN traffic flow's state. The requirements of a particular APN flow record are derived from the routes, and service rule that the APN traffic flow matches. The state of APN flow record includes, but is not limited to, APN service type, APN service instance, information pertaining to the last APN path selected, current APN flow sequence number, time of last packet received, time of last packet transmitted, counts of packets and bytes processed, sets of pending packets for sequence reordering, sets of pending packets for fragmentation, and sets of historical records for packets previously processed.

An APNA, having client node conduit service processing stages 240 as shown in FIG. 2B, is able to redirect communication traffic to selectable applications which may reside as software accessible applications within the same hardware of the APNA, option 1, or may reside in hardware external to the APNA, option 2. A WANapp table is used to match traffic to a specific algorithm using a set of rules to compare packets against. It is assumed that different algorithms that are in use simultaneously would be designed for different types of traffic. For example, a rule could specify that an application to optimize web traffic is to receive TCP packets on ports 80 and 443 and another application to optimize domain name system (DNS) names is to receive user datagram protocol (UDP) packets on port 53. The web cache communication protocol (WCCP) and the WANapp table support the specification of this type of rule.

If application rules overlap, such as having two algorithms request all TCP packets, the t2_app uses the first algorithm it sees in the WANapp table. The WCCP supports a service priority field and the t2_app sorts the WANapp table based on the service priority field values.

In another embodiment that supports forwarding packets to multiple algorithms, a user would specify an ordering of the multiple algorithms. For example, when a packet is received from an algorithm, such as from layer 2 (L2) at step 316 in FIG. 3A as described in more detail below, another lookup in the WANapp table would be used to determine if the process 300 should proceed to box 328 or to a different step (not shown) to apply a next algorithm in the specified order.

Regarding the WAN ingress conduit service processing stages 242, virtual WAN software operates on the APNA as a web cache communication protocol router and according to information on an application that is selected for use and information on the communication traffic received, and redirects the communication traffic to the selected application for optimization. This redirection means that the communication traffic leaves the virtual WAN software at a point inside of the WAN ingress conduit service processing stages 242. On return from the selected application, the optimized communication traffic is reinserted at or approximately at the point where it left the WAN ingress conduit service processing stages 242. This redirection is represented by WAN ingress redirect application processing stage 246 and also by WAN egress redirect application processing stage 266.

For option 1, having software accessible applications within the same hardware of the APNA, the t2_app 290 opens a raw socket on a high performance interface, referred to herein as a loop interface, to send and receive packets from a WANapp virtual machine. For option 2, having software accessible applications in hardware external to the APNA, the t2_app 290 encapsulates the packets to be forwarded to external devices using a generic routing encapsulation (GRE) protocol over another arbitrary network layer protocol, such as an Internet protocol (IP).

A WANapp table data structure is created which contains information about what traffic a WCCP server would like to have redirected and how that redirection should happen.

In addition to the flow structure utilized in the t2_app 290, a separate hash table (op_hash) is maintained that tracks which 6-tuples (routing domain id, source IP, destination IP, protocol, source port, and destination port) have been sent to WANapp. Data about an original packet, including a differentiated services code port (DSCP) tag and the virtual interface (VIF) which received the packet, is stored in this hash table. The VIF is a data structure that records which Ethernet interface and virtual local area network (VLAN) received this packet. For some types of traffic, the source VIF is used to determine the destination VIF so the source VIF needs to be saved. When packets are received from WANapp, the op_hash table is consulted so that original data about the packet can be restored prior to further processing.

A data flow for Internet and intranet services that go through external WAN traffic optimization are very similar to conduit flows described herein. The flow definition as noted above indicated that a service identifier can be used in the n-tuple. In a similar manner, a conduit flow is a flow where the service identifier of a conduit is used. Likewise, an intranet flow uses the service identifier of an intranet service.

To implement the steps in these conduit flows, it is sufficient to hook into the IP forwarding step to decide when the WANapp should be performed. The IP forwarder can check the WANapp table to determine if the WANapp is needed for each packet. Packets received from an Ethernet port are marked as WANapp-eligible. Packets received from the loop interface and packets received from external forwarded devices, having generic routing encapsulation (GRE), are also marked as WANapp-ineligible. The IP forwarder forwards packets to the WANapp, if the WANapp table indicates that WANapp optimization is needed and the packet is marked as WANapp-eligible. The IP forwarder is the earliest phase of the software platform pipeline that understands the "direction" of a packet. For example, the IP forwarder knows if a packet is going from the LAN to a WAN service or vice versa. The IP forwarder knows this from doing a route lookup on the IP addresses in the packet. This capability is utilized in sending packets for WANapp optimization, which in one embodiment is done for packets using conduit or intranet services. Packets moving from one LAN segment to another LAN segment can then skip WANapp processing since that processing would not be needed. Similarly, traffic using the Internet service can be skipped since arbitrary Internet hosts will not have a WANapp processor that can handle optimized traffic.

The packets that t2_app 290 receives from a WANapp optimization generally do not have an original differentiated services code point (DSCP) tag. WANapp uses the DSCP tag as an in-band signaling mechanism. The primary purpose of this tag usage is to adjust a priority of a flow dynamically. The DSCP tag maps to a particular class on the conduit. All IPv4 packets have a DSCP tag as it is a required part of the header. This tag is generally set to zero by default, which is interpreted as "not set". The key word in the first sentence of this paragraph is "original". The packets from WANapp do not have the DSCP value that the data packet had when it was originally received from the LAN receive or WAN receive, stage 243 or 263 of FIG. 2B, respectively. Packets from WANapp have a DSCP value that is a signaling mechanism. Since data flows do not generally change their DSCP frequently, it is safe to store the last DSCP value that the original data packets used and use that value to overwrite the signaling DSCP value in WANapp packets.

LAN to WAN packets that are to be optimized and go through a conduit use the following stages of processing. Items in this list marked with '*' represent steps that are part of Option 1. Items marked with '' are steps that occur outside of the ingress conduit service processing stages 242** of FIG. 2B. Items marked with '*3' represent steps that are new for option 2 and '3' are steps that occur outside of the ingress conduit service processing stages 242** of FIG. 2B for Option 2.

At stage 243, a packet is received from a LAN

At stage 244, a route lookup on the source IP address identifies that this packet came from the LAN.

At stage 244, a route lookup on the destination IP address identifies that this packet is destined for the WAN, via a conduit, to the Internet or an intranet.

*At stage 244, a lookup in the WANapp table determines that the WCCP has an indication that this packet is to be sent to a WANapp device and identifies at which point in the ingress flow processing stage 244 the packet is to be forwarded to the WANapp device. The identified point can vary depending on the type of redirected application program and on whether the WANapp device redirected application program is on a separate process from the WAN ingress processing pipeline on an APN appliance, or on a virtual machine on the same APN appliance as the WAN ingress processing pipeline, or on a hardware device that is separate from the APN appliance. Also, arbitrary state information about a flow can be stored in one or more appropriate data structures, as described in further detail below, and that state restored when packets are received from the WANapp device.

*At stage 244, identification (id) data, including a DSCP tag, a received VIF, source media access control (MAC) address, and route lookup results, for this packet are saved into the op_hash.

*if (Forwarding_method uses layer 2 (L2))
    {
    *At stage 244, change destination MAC address and forward from identified point in the ingress flow processing stage 244 to WANapp device redirected application 251 on the loop interface 247.

At stage 246, the WANapp device redirected application 251 does its optimization task on the packet, such as applying a selectable application, such as compression, encryption, or the like, and forwards the optimized packet through a return loop interface 252**.

*At stage 254, the packet is received from the return loop interface 252, through multiplexing device 249 on output path 250 from a loop device to a next stage of processing in sequence from the identified point in the ingress flow processing stage 244. Depending upon the earliest point of departure to the WANapp device, there may be an overlap of processing, to account for the different departure and return points, to allow a variable return point in the WAN ingress conduit processing stage 254. Note that if there is a single point of departure to the WANapp device redirected application 251 in stage 244 and a single return point in stage 254, the overlap in processing would not be required. The received optimized packet is validated and marked that it was received from the WANapp loop device. It is noted, that the multiplexing device 249 may be a hardware device or a software construction providing multiplexing capabilities.
}else if (Forwarding_method uses GRE)
{
*3 At stage 244, the GRE is used to encapsulate the packet, configured to be WANapp-eligible, and forwarded to the WANapp device redirected application 251.

3 At stage 246, the WANapp device redirected application 251** decapsulates the packet, does its optimization task on the packet, such as applying a selectable application, such as compression, encryption, or the like, uses GRE to encapsulate the optimized packet, and returns the GRE encapsulated optimized packet.

*3 At stage 254. A GRE encapsulated optimized packet is received from the WANapp device redirected application 251.

*3 At stage 254, the GRE optimized data packet is decapsulated, validated and marked received from the external WANapp device redirected application 251
}
*At stage 254, a 5-tuple packet is used to access the original identification data from the op_hash.

*At stage 254, the optimized packet is updated with route data from the op_hash.

*At stage 254, the optimized packet is restored with the original DSCP, VIF, and source MAC address from the op_hash.

At stage 254, a rule lookup is done which software also gets or creates the flow structure for this optimized packet.

*At stage 254, a DSCP from the optimized packet is used to update a quality of service (QoS) class setting for this optimized packet, assuming the destination service utilizes a conduit.

At stage 254, the optimized packet proceeds to normal WAN Ingress conduit processing.

Figure 3A:
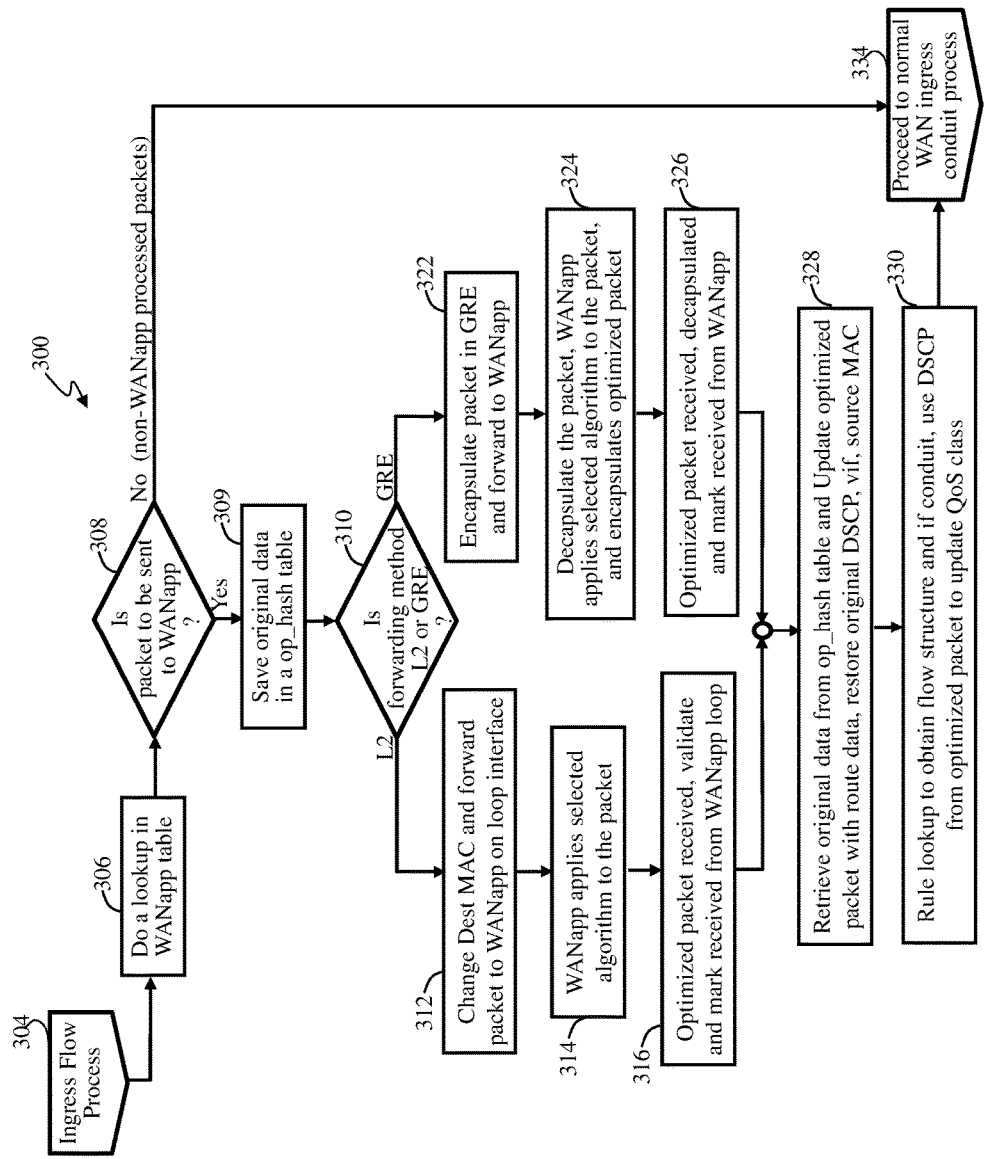
FIG. 3A illustrates a client node WAN ingress process for accessing one or more applications that are selectable from a plurality of applications and provide a variety of different WAN optimization techniques in accordance with an embodiment of the present invention.

FIG. 3A illustrates a client node WAN ingress process 300 for accessing one or more applications that are selectable from a plurality of applications and provide a variety of different WAN optimization techniques in accordance with an embodiment of the present invention. Data packets are received at step 304 for processing from a client's local area network (LAN) at stages 243 and 244 of FIG. 2B. At step 304, the data packets are time stamped and at step 306, a route lookup of the source IP address is done and a route look up of the destination IP address is also done. At step 308, a determination is made whether the packet is to be sent to a WANapp device or application, such as the redirected application 251 of FIG. 2B, for optimization processing. In one embodiment, a lookup in a WANapp table determines whether the data packet should be sent to the WANapp for further processing or continue with normal WAN ingress processing. If the WANapp table lookup indicates that the packet should be processed normally, the process 300 proceeds to step 334 to continue normal ingress processing of the data packet. If the WANapp table lookup indicates that the packet should be set to the WANapp for further processing, the process 300 proceeds to step 309. At step 309, an original identification (id) for this packet, including DSCP tag, received VIF, source MAC address, and route lookup results, are stored in the op_hash table. At step 310, the method of forwarding the data packet is determined. If the forwarding method is by use of layer 2 (L2) methods, the process 300 proceeds to step 312. At step 312, the destination MAC address is changed to direct the data packet to the selected WANapp destination and the process 300 forwards the data packet to the selected WANapp over a high performance interface, such as a loop interface as described herein. At step 314, the selected WANapp applies an associated selected algorithm on the data packet, such as applying a selected compression algorithm to the data. At step 316, the optimized data packet is received at the WAN ingress conduit processing stage 254. Also, at step 316, the optimized data packet is validated and marked as being received from the selected WANapp loop interface. The process 300 then proceeds to step 328.

Returning to step 310, if the forwarding method is by generic routing ecapsulation (GRE), the process 300 proceeds to step 322. At step 322, the data packet is encapsulated, such as providing a GRE packet header and configured to be WANapp eligible. The process 300 forwards the data packet to the selected WANapp. At step 324, the selected WANapp applies an associated selected algorithm on the data packet, such as applying a selected compression algorithm to the data. At step 326, the optimized data packet is received at the WAN ingress conduit processing stage 254. Also, at step 326, the optimized data packet is decapsulated and marked as being received from the selected WANapp. The process 300 then proceeds to step 328.

At step 328, the original id data from the op_hash table are retrieved and the original DSCP tag, received VIF, and source MAC address are restored. At step 330, a rule lookup is done to obtain the flow structure and if the destination service is by a conduit, a DSCP from the optimized data packet is used to update a quality of service (QoS) class. The optimized data packet proceeds through the normal ingress conduit processing at stage 254 and then to the WAN facing Ethernet send stage 255 to the WAN and onto the destination.

WAN to LAN packets that get optimized and go through a conduit also go through the following processing steps. Items in this list marked with '*' represent steps that are part of Option 1. Items marked with '**' are steps that occur outside of the egress conduit service processing stages 262 of FIG. 2B. Items marked with '*3' represent steps that are new for option 2 and '**3' are steps that occur outside of the egress conduit service processing stages 262 of FIG. 2B for Option 2.

At stage 263, a packet is received from the WAN
At stage 264, a route lookup on the source IP address identifies that this packet came from the WAN.
At stage 264, a check on the destination IP shows that the packet is destined for this APN appliance.
At stage 264, a check of protocol type (UDP) and destination port shows that the packet is a conduit packet.
At stage 264, the packet is decrypted and identified as using a transport reliable protocol (TRP) protocol.
At stage 264, the packet is resequenced based on the path sequence number.
At stage 264, the packet is identified as containing user data.
At stage 264, a rule lookup is done which software also gets or creates the flow structure.
At stage 264, the packet is resequenced based on the flow sequence number.
At stage 264, a conduit encapsulation is removed from the packet leaving the user data.
At stage 264, a route lookup on the destination IP address identifies that this is destined for the LAN.
*At stage 264, a lookup in WANapp table determines that the WCCP has an indication that this packet should be sent to a WANapp device and identifies at which point in the egress path processing stage 264 the packet is to be forwarded to the WANapp device. The identified point can vary depending on the type of redirected application program and on whether the WANapp device redirected application program is on a separate process from the WAN egress processing pipeline on an APN appliance, or on a virtual machine on the same APN appliance as the WAN egress processing pipeline, or on a hardware device that is separate from the APN appliance. Also, arbitrary state information about a flow can be stored in one or more appropriate data structures, as described in further detail below, and that state restored when packets are received from the WANapp device.
*At stage 264, identification (id) data, including a DSCP tag and route lookup results, for this packet are saved into the op_hash.
*if (Forwarding_method uses layer 2 (L2))
{
*At stage 264, change destination MAC address and forward from the identified point in the egress path processing stage 264 to WANapp device redirected application 271 on the loop interface 267.
**At stage 266, the WANapp device 271 does its optimization task on the packet, such as applying a selectable application, such as compression, encryption, or the like, and forwards the optimized packet through a return loop interface 272.
*At stage 274, the packet is received from the return loop interface 272, through multiplexing device 269, on output path 270 from a loop device to a next stage of processing in the sequence from the identified point in the WAN ingress path processing stage 264. Depending upon the earliest point of departure to the WANapp device, there may be an overlap of processing, to account for the different departure and return points, to allow a variable return point in the WAN ingress conduit processing stage 254. Note that if there is a single point of departure to the WANapp device redirected application 251 in stage 244 and a single return point in stage 254, the overlap in processing would not be required. The received optimized packet is validated and marked that it was received from the WANapp loop device. It is noted that the multiplexing device 269 may be a hardware device or a software construction providing multiplexing capabilities.

}else if (Forwarding_method uses GRE)
{
*3 At stage 264, the GRE is used to encapsulate the packet, configured to be WANapp-eligible, and forwarded to the WANapp device 271.
3 At stage 266, the WANapp device 271** decapsulates the packet, does its optimization task on the packet, such as applying a selectable application, such as compression, encryption, or the like, uses GRE to encapsulate the optimized packet, and returns the GRE encapsulated optimized packet.
*3 At stage 274, a GRE encapsulated optimized packet received from the WANapp device 271
*3 At stage 274, the GRE optimized packet is decapsulated, validated, and marked received from the external WANapp device 271
}
*At stage 274, a 5-tuple packet is used to access the original id data from op_hash.
*At stage 274, the optimized packet updated with route data from the op_hash.
*At stage 274, a rule lookup is done which also gets (or creates) the flow structure for this optimized packet.
*At stage 274, the optimized packet is restored with the original DSCP and source MAC address from the op_hash.
At stage 274, the packet proceeds to normal WAN egress processing, including IP forwarding at stage 274, followed by address generation using address resolution protocol (ARP) at stage 275, and then sending the optimized packet out on an Ethernet port at stage 275.

Figure 3B:
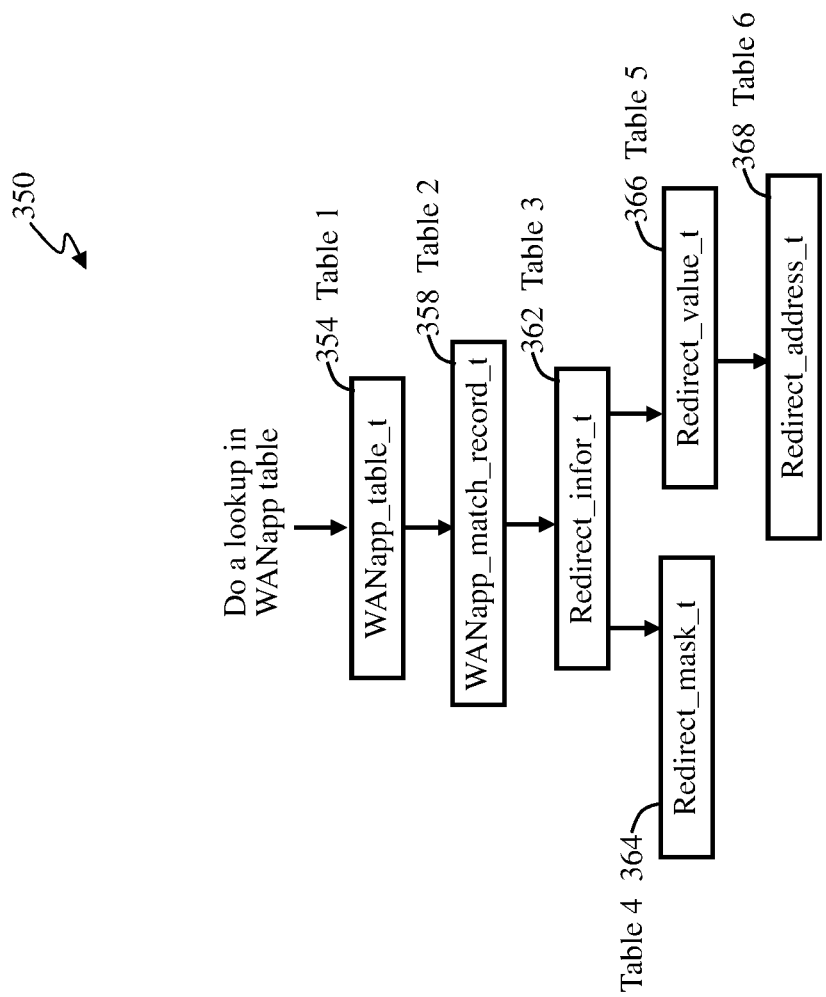
FIG. 3B illustrates an WANapp data structure hierarchy in accordance with an embodiment of the present invention.

FIG. 3B illustrates an WANapp data structure hierarchy 350 in accordance with an embodiment of the present invention. The WANapp data structures within the hierarchy 350 hold information that is used to determine which packets should be sent for WANapp processing and where those packets should be sent. The WCCP is designed to primarily work in clustered environments where multiple WANapp devices are present and flows are load balanced across those WANapp devices. The WCCP allows the WANapp devices to specify how flows should be balanced across the devices.

The WANapp table is a data structure that describes the traffic that should be redirected to an optimization algorithm. In one embodiment, the WANapp requests all TCP traffic which results in a single entry for all packets to be optimized and stored in the WANapp table. That entry matches on the IP protocol field with a value of TCP and wildcards all other fields. But all packets that will be optimized end up hitting that one entry. That is advantageous because it means there is no need to scan a long list of rules. For example, the capability is included for the WANapp to specify service type combinations in the rules, such as any conduit to any intranet. It is noted that even if that capability is fully used, there generally ends up with less than ten rule entries in the table.

The WANapp table data structure uses very little memory as one table is sufficient for the appliance due to use of the single entry for all packets to be optimized, as noted in the embodiment above. All traffic to or from the WAN is checked against the same data structure so this table does not cause memory use to increase as more WAN services are added to the network configuration. For example, in another embodiment, the APN application provides WANapp optimized services only LAN to WAN and WAN to LAN traffic. In addition, it is also known that Internet services are not eligible for WANapp optimizations. For this exemplary embodiment, there is no need to encode rules in the table that would be used to match specific WAN services. Table 1 shows the fields in one suitable WANapp table structure. There are size fields which track the current size of the table and a WANapp match table array that contains the data describing which packets should be optimized. In Table 1, the match criteria is an array of the structures defined in Table 2. Also in Table 1, the current number of match criteria is the size of the array.

The WANapp table structure is accessed through a current WANapp table pointer. This allows the WANapp table to be updated by creating a new table and adjusting the WANapp table pointer to refer to the new table. There are two WANapp match tables. A first WANapp match table is used by data forwarding code. If updates are received from a WANapp, via WCCP, then the second WANapp match table is updated. The pointer value is updated to point to the table, the first or the second, that was just updated. Before processing each packet, a get_current_wanop_table( ) function is called to get a pointer to the table that should be used to process packets. The pointer points to the structure defined by Table 1. This technique allows the WANapp table to be searched without the use of locks.

A packet that is redirected to a WANapp device follows a sequence of steps according to the specified data structures.
1. Get the current wanapp_table pointer from the get_current_wanapp_table( ) function. This function is called for each packet and the returned value is not cached as the pointer could change to point to a different wanapp_table if the WCCP changes the redirect data.
2. Search through the wanapp_match_table array in the wanapp_table to determine if WANapp is interested in this packet. This search checks the IP protocol and/or TCP/UDP port number against the IP protocol and port number in each entry of the wanapp_match_table until the first match is found. If a match is found, then WANapp is interested in this type of traffic, otherwise the traffic is not redirected.
3. Search through the redirect_masks_and_values table of the wanapp_match_record_t structure identified in step 2 to determine which WANapp device should handle this packet. This is done by ANDing the IP address and port fields of the packet with mask values in the redirect_mask_t structure and checking the result against a value in the redirect_values array. The first exact match in that array results in a redirect_address_info_t structure.
4. Look in the redirect_address_info_t structure that was found in step 3 and use the wanapp_client_ipv4_address_network_order field as the IP address of the WANapp device that should receive this packet.

TABLE 1

| WANapp_table_t structure | | |
|---|---|---|
| Type | Name | Use |
| u_int8_t | WANapp_table_size | The current number of match criteria the table holds. |
| WANapp match record_t [Max WANapp Table Size] | WANapp_match_table | Array of the actual match criteria. |

The WANapp match table array is a static array of WANapp match record structures. The array is sorted in descending order of a service priority field. When a packet is checked, the software iterates through the WANapp match table, starting from the beginning, and stops on the first WANapp match record_t structure that matches the packet. The IP protocol and port number from the packet are checked against the ip_proto_network_order, port_type, and port_list_network_order fields. In the description for port_type in Table 2, the port_type determine whether the source or destination port of the packet should be checked. All other fields in the WANapp_Match_Record_t structure refer to how matched packets are handled.

The WANapp match record_t structure is shown in Table 2. Table 2 includes type fields used to determine if a packet should be sent to a WAN optimizer and which WCCP client should receive the optimized packet. The WCCP client is the WANapp algorithm which uses WCCP to communicate to a forwarding service and acts as the WCCP client. The ip_proto, port_list, port_list_size, and port_type fields are used when determining if a packet matches this record. Such determining uses a search for an exact match of the IP protocol field and a port in the port list. The port that is checked, such as a source port or destination port, is determined by the port_type field.

The redirect_masks_and_values list is an array of redirect_info_t structures (see Table 3). This structure contains a single mask in the redirect_mask field (see Table 4). Each field in the redirect_mask is ANDed with the corresponding field of a packet to compute a redirect_value_t structure (see Table 5). The new redirect_value_t structure is compared against the values in the redirect_values array. If the source_ip_address_network_order, destination_ip_address_network_order, source_port_network_order, and destination_port_network_order fields match, then the redirect_address field is used as the WANapp device to receive the traffic.

TABLE 4 redirect_mask_t structure

| Type | Name | Use |
|---|---|---|
| u_int32_t | source_ip_address_network_order | Value to AND to the source IP address in a packet |

TABLE 2

WANapp_Match_Record_t structure

| Type | Name | Use |
|---|---|---|
| u_int8_t | service_group_id | The service group that is the source for this record |
| u_int8_t | service priority | The service priority from the Redirect Assign message. The WANapp match table orders the WANapp match structures by the service priority from highest to lowest |
| u_int8_t | forwarding_method | Either WANapp_forwarding_GRE or WANapp_forwarding_L2. |
| u_int8_t | traffic_assignment_method | Either WANapp_traffic_Hash or WANapp_traffic_Mask. |
| u_int16_t | ip_proto_network_order | IP protocol number in network byte order. Value of 0xffff means all protocols, anything else interpreted as a specific protocol |
| u_int8_t | port_type | Either WANapp_SRC_Port, WANapp_DST_Port, WANapp_Port_unknown (when there are no ports defined) |
| u_int8_t | port_list_size | Number of ports in port list. Could be zero. |
| u_int16_t[Max_WANapp_Port] | Port_list_network_order | The port number in network bye order to match against |
| u_int8_t | Num_redirect_masks_and_values | Number of elements in the redirect_masks_and_values array |
| Redirect_info_t[Max_WANapp_Redirect_Masks] | Redirect_masks_and_values | The masks and values for each WANapp device |

The WANapp_Match_Record uses the Redirect_Masks_and_Values array to determine which WANapp device should receive a packet. The array has Max_WANapp_Redirect_Masks elements. Each element defines a mask and then Max_WANapp_Redirect_Values elements which contain a value and redirection information for a WANapp device. As described in more detail below, a binary AND operation is used of a field against a mask and then an exact match for a value in the redirect_values list.

TABLE 3 redirect_info_t structure

| Type | Name | Use |
|---|---|---|
| redirect_mask_t | redirect_mask | The mask to use when checking against the redirect_values. |
| u_int8_t | num_redirect_values | Number of values in redirect_values. |
| redirect_value_t | redirect_values [Max_WANapp_Redirect_Values] | The values to check against. |

TABLE 4-continued redirect_mask_t structure

| Type | Name | Use |
|---|---|---|
| u_int32_t | destination_ip_address_network_order | Value to AND to the destination IP address in a packet |

TABLE 4-continued

| | redirect_mask_t structure | |
|---|---|---|
| Type | Name | Use |
| u_int16_t | source_port_network_order | Value to AND to the source port in a packet |
| u_int16_t | destination_port_network_order | Value to AND to the destination port in a packet |

TABLE 5

| | redirect_value_t structure | |
|---|---|---|
| Type | Name | Use |
| u_int32_t | source_ip_address_network_order | Expected value of packet's source IP address after AND with the source_ip_address of the mask |
| u_int32_t | destination_ip_address_network_order | Expected value of packet's destination IP address after AND with the destination_ip_address of the mask |
| u_int16_t | source_port_network_order | Expected value of packet's source port after AND with the source port of the mask |
| u_int16_t | destination_port_network_order | Expected value of packet's destination port after AND with the destination port of the mask |
| redirect_address_info_t | redirect_address | The address information to use for WANapp redirection if the masked values match |

Table 6 provides a redirect_address_info_t structure that contains addressing needed to forward a packet to a WANapp device. In an alternative embodiment, an address_type of WANapp_Address_Alt_Hash, a feature of WCCP, would cause alternate hashing to be used in systems where it is supported. For this embodiment, the address type is WANapp_Address_IPV4 and the WANapp_client_ipv4_address_network_order field contains the IPv4 address of a WANapp device. If the address_type is WANapp_Address_Empty, then the traffic passes through the system unoptimized.

TABLE 6

| | redirect_address_info_t structure | |
|---|---|---|
| Type | Name | Use |
| u_int8_t | address_type | Either WANapp_Address_Empty or WANapp_Address_IPV4. |
| u_int32_t | WANapp_client_ipv4_address_network_order | The IP address of the WCCP client to receive traffic. (This is in host byte order.) |

When a packet is matched against a WANapp_match_record_t, a WANapp_match_t structure, shown in Table 7, is created and used to steer further processing of the packet. The WANapp_match_t structure is represented by a subset of information within the matching WANapp_match_record_t. As part of creating the WANapp_match_t structure, the necessary packet masking and value lookup is done to determine which WCCP client should receive the packet. This is why there is only one redirect_info_t structure instead of the array of WCCP clients that are part of the service group.

TABLE 7

| | WANapp_match_t structure | |
|---|---|---|
| Type | Name | Use |
| u_int8_t | service_group_id | The service group that is the source for this record. |
| u_int8_t | service_priority | The Service Priority from a Redirect_Assign message. The WANapp_match_table orders the WANapp_match structures by the service_priority from highest to lowest. |

TABLE 7-continued

| | WANapp_match_t structure | |
|---|---|---|
| Type | Name | Use |
| u_int8_t | forwarding_method | Either WANapp_Forwarding_GRE or WANapp_Forwarding_L2. |
| redirect_info_t | redirect_info | The addressing information of the WANapp device that should process this packet. |

Regarding use of generic routing encapsulation (GRE), a GRE tunnel is established with the external WANapp that is configured. The source IP address for the GRE tunnel is configured to be an internal address, which identifies the virtual IP (VIP) Address configured in the system. A configuration editor is used to display the VIP address that is selected for this purpose. The user has an option to select a VIP address from the configured VIP addresses in an interface group to be used as the identified VIP. In this way, this address does not need to change if another VIP address in the interface group is changed. This approach selects which IP address, out of the many that are available, to use as the endpoint of the GRE tunnel.

Heartbeat messages are sent periodically, such as every ten seconds, from the APN appliance. This heartbeat message is an Internet control message protocol (ICMP) message having the source IP address of the external WANapp and a destination IP address that is this appliance's selected VIP address, encapsulated in a GRE layer. The external WANapp on receiving this GRE heartbeat packet can decapsulate the received ICMP message and forward the resulting ICMP message in the normal forwarding chain. If the heartbeat is not received for three consecutive heartbeat periods, such as three consecutive thirty seconds periods, for example, the GRE tunnel would be marked as down. The status of the GRE tunnel is marked as up as soon as the GRE tunnel receives a heartbeat message response indicating the WANapp has received the GRE heartbeat message. As noted above, a heartbeat message is sent on the GRE tunnel. When a heartbeat response is received, the GRE tunnel is allowed to be used for traffic.

Regarding using a WANapp hash data structure when the WANapp_table_t indicates that a packet should be sent to WANapp, it is necessary to save some information about the flow, so that packets of that flow that are received from WANapp can be handled properly. This flow information is maintained with the WANapp_hash_t data structure.

The WANapp_hash_t data structure is similar in structure to the flow database structure. This data structure is organized as a hash table in order to provide for fast lookup of a flow. The WANapp_hash_t table stores a WANapp_flow_record_t for each flow. Table 8 WANapp flow record t structure shows the fields of the record. The WANapp_hash_t structure is a hash table that provides fast access to WANapp_flow_record_t (Table 8) structures. It is noted that the index into the hash table is the source and destination IP address, IP protocol, and source and destination ports. This is the n-tuple, such as where n=6, that is used to identify the flow for WANapp purposes. The term n-tuple is used because over time additional fields most likely will be added to the tuple as new features are implemented.

IPv4 options are not stored in the WANapp_flow_record_t structure, but the WANapp will see the options just as virtual WAN received them. The IPv4 options are not modified by t2_app when packets are sent to WANapp. The t2_app 290 forwards packets to the network with whatever IPv4 options WANapp sets in the packet.

The op_hash is sized to handle four times the number of flows as supported by the existing flow database, for example. The lifetime of the Table 8 records is longer than for the records kept of existing flows. This means that when normal flows are purged, such as a TCP connection closes, the WANapp_flow_record_t structure must stay around for longer. To account for such events, Table 8 must be sized larger than current operations require. This is done because the WANapp algorithm may send data related to that connection even after it appears closed. If a WANapp_flow_record_t cannot be obtained because the op_hash is full, then the packet is not sent to WANapp and the flow is not accelerated.

Any WANapp_flow_record_t structure that does not get hit for a first pre-specified period, such as five minutes, for example, is removed from the op_hash table. For example, five minutes is greater than twice a maximum segment lifetime (MSL) of a second pre-specified period, such as one minute. If a flow goes five minutes with no hits, then it is concluded that WANapp has no user data to initiate and data for that flow is only passed to WANapp if it is received from the LAN or WAN in which case a proper WANapp_flow_record_t structure is recreated.

Records in the op_hash are freed based on timeout indications from timers that periodically run. Data structures associated with the records are removed from the op_hash table and freed or made available for more current records. The op_hash table is scanned every 500 ms, for example, for entries that have not been hit in the last five minutes. Because there can be a large number of entries in the op_hash table, multiple timers are used to scan the table with each timer being responsible for checking five thousand buckets, for example. The hash table works by taking the fields of a flow and doing some math to compute a bucket number. Ideally, each flow would compute a unique bucket number. In reality, collisions happen, so the bucket is a linked list of flow records. Everything in a bucket are flows which just happen to end up computing the same bucket number. Typically, the number of items in a bucket will be very small, such as just one item, and rarely more than 3-4 items. With a small number of buckets to check, each timer is able to run very quickly without disturbing other timers that are running in parallel. This process also prevents a large proliferation of timer events that would occur if a timer were maintained for each record in the op_hash.

TABLE 8

WANapp_flow_record_t structure

| Type | Name | Use |
| --- | --- | --- |
| u_int8_t | dscp | The DSCP tag of the unoptimized packet when received from the LAN. |
| interface_t | input_interface | Contains the input_interface from the packet when received by the IP forwarder. |
| VLAN_t | input_vlan_tag | The VLAN tag of the unoptimized packet when received from the network. |
| destination_networks_service_e | dst_service_dns | Result of route lookup on destination |
| source_networks_service_e | src_service_dns | Result of route lookup on source. |
| standard_description_key_t | input_std_key | A copy of packet→std_key. |
| u_int8_t | acceleration_disabled | Set to 1 if WANapp has indicated through the explicit congestion notification (ECN) bits that acceleration of this flow is not desired. |
| u_int64u_i_t | hit_count | Incremented each time a lookup into op_hash hits this record. |
| u_int64_t | last_hit_time_us | The timestamp the last time the hit_count was incremented. |

WANapp has the ability to examine certain protocols and determine the priority of a flow at a given point in time. Since virtual WAN is responsible for actual QoS enforcement through the conduit, a communication path is provided where WANapp dynamically informs the virtual WAN of the priority of a flow. This notification is done with an inband signaling protocol using the differentiated services code point (DSCP) and explicit congestion notification (ECN) bits of IPv4 packets sent from WANapp to the virtual WAN.

When a virtual WAN sends packets into WANapp, the virtual WAN saves the original DSCP and ECN bits on the assumption that these generally do not change regularly. When WANapp sends traffic back to the virtual WAN, the WANapp replaces the original DSCP and ECN bits with the inband signaling protocol. The virtual WAN uses inband signaling bits of the received traffic to decide the QoS class and then restores the original DSCP and ECN bits to the traffic.

TABLE 9

DSCP Field Mapping

| DSCP Field Value | Action |
|---|---|
| 0 | Use t2_app rule setting |
| 1 | WANapp_class0 |
| 2 | WANapp_class1 |
| 3 | WANapp_class2 |
| 4 | WANapp_class3 |

A set of counters to track redirected packets is contained in the WANapp_redirect_counters_t structure. These counters are cumulative counters and are useful for supporting diagnostics and trouble shooting. The counters available in this structure are shown in Table 10.

TABLE 10

WANapp_redirect_counters_t structure

| Type | Name | Notes |
|---|---|---|
| u_int64_t | tx_to_WANapp_packets | Count of packets sent to WANapp |
| u_int64_t | tx_to_WANapp_bytes | Count of bytes sent to WANapp |
| u_int64_t | rx_from_WANapp_packets | Count of packets received from WANapp |
| u_int64_t | rx_from_WANapp_bytes | Count of bytes received from WANapp |
| u_int64_t | WANapp_class_unchanged_packets | Count of packets received from WANapp that did not request a change of class |
| u_int64_t | WANapp_class_unchanged_bytes | Count of bytes received from WANapp that did not request a change of class |
| u_int64_t | WANapp_class_0_packets | Count of packets received from WANapp that requested Class 0 |
| u_int64_t | WANapp_class_0_bytes | Count of bytess received from WANapp that requested Class 0 |
| u_int64_t | WANapp_class_1_packets | Count of packets received from WANapp that requested Class 1 |
| u_int64_t | WANapp_class_1_bytes | Count of bytes received from WANapp that requested Class 1 |
| u_int64_t | WANapp_class_2_packets | Count of packets received from WANapp that requested Class 2 |
| u_int64_t | WANapp_class_2_bytes | Count of bytes received from WANapp that requested Class 2 |
| u_int64_t | WANapp_class_3_packets | Count of packets received from WANapp that requested Class 3 |
| u_int64_t | WANapp_class_3_bytes | Count of bytes received from WANapp that requested Class 3 |
| u_int64_t | op_hash_full_packet_count | Incremented each time an attempt was made to get a op_hash entry, but an entry could not be obtained because the hash table was full. |
| u_int64_t | WANapp_invalid_dscp_value_count | Incremented if WANapp sends a packet with a DSCP value that does not map to a known value. |

The DSCP bits hold class information in six DSCP bits, though not limited to this, the six DSCP bits is enough to specify 64 classes. A class value of zero means that the virtual WAN should use its own rules and do whatever it was going to do. Class values 1 through 4, for example, specify a specific QoS class that is assumed to exist. This mapping is shown in Table 9. The compiler creates some default classes for class values 1-4. In an exemplary embodiment, the other 59 DSCP values are unused.

The ECN bits allow WANapp to signal to a virtual WAN that a flow cannot be accelerated and that the virtual WAN should not continue to redirect that flow. For example, if the ECN value is non-zero, then the acceleration_disabled field in the WANapp_flow_record_t for that flow is set to 1 and the flow is no longer redirected to WANapp. With the ECN value set to zero, normal processing occurs and packets for that flow are sent to the WANapp.

A second set of counters is defined in the WANapp loop_stats structure shown in Table 11. This structure contains counts of all packets going across the WANapp loop interface. This second set of counters' data is related to the WANapp_redirect_counters_t data, but the second set of counters of Table 11 count additional packets, such as packets associated with the address resolution protocol (ARP) and signaling channel data.

TABLE 11

WANapp loop_stats structure

| Type | Name | Notes |
|---|---|---|
| u_int64_t | packets_rx | |
| u_int64_t | bytes_rx | |

TABLE 11-continued

WANapp_loop_stats structure

| Type | Name | Notes |
|---|---|---|
| u_int64_t | read_error_count | |
| u_int64_t | packets_tx_dropped | |
| u_int64_t | packets_tx | |
| u_int64_t | bytes_tx | |

To manage the loop interface, a new interface module called WANapp loop is created. This loop interface does not use any of the infrastructure used to manage the current eni_db. This is because the eni_db depends on data in the registry, which comes from the compiler. Since the compiler has no knowledge of this internal loop interface, including the WANapp loop into the eni_db would change the nature of the database (db). The WANapp loop supports reading and writing of packets, provides counters for what is sent and received, and also provides a simple address resolution protocol (ARP) table to maintain the MAC address of the WANapp virtual machine.

New tcon -debug commands are included to query the status of the WANapp loop interface. Example debug commands include commands to display the contents of the WANapploop configuration, including any ARP entries being maintained for this interface, and a display of the counters associated with the WANapploop interface, and the like.

Figure 4:
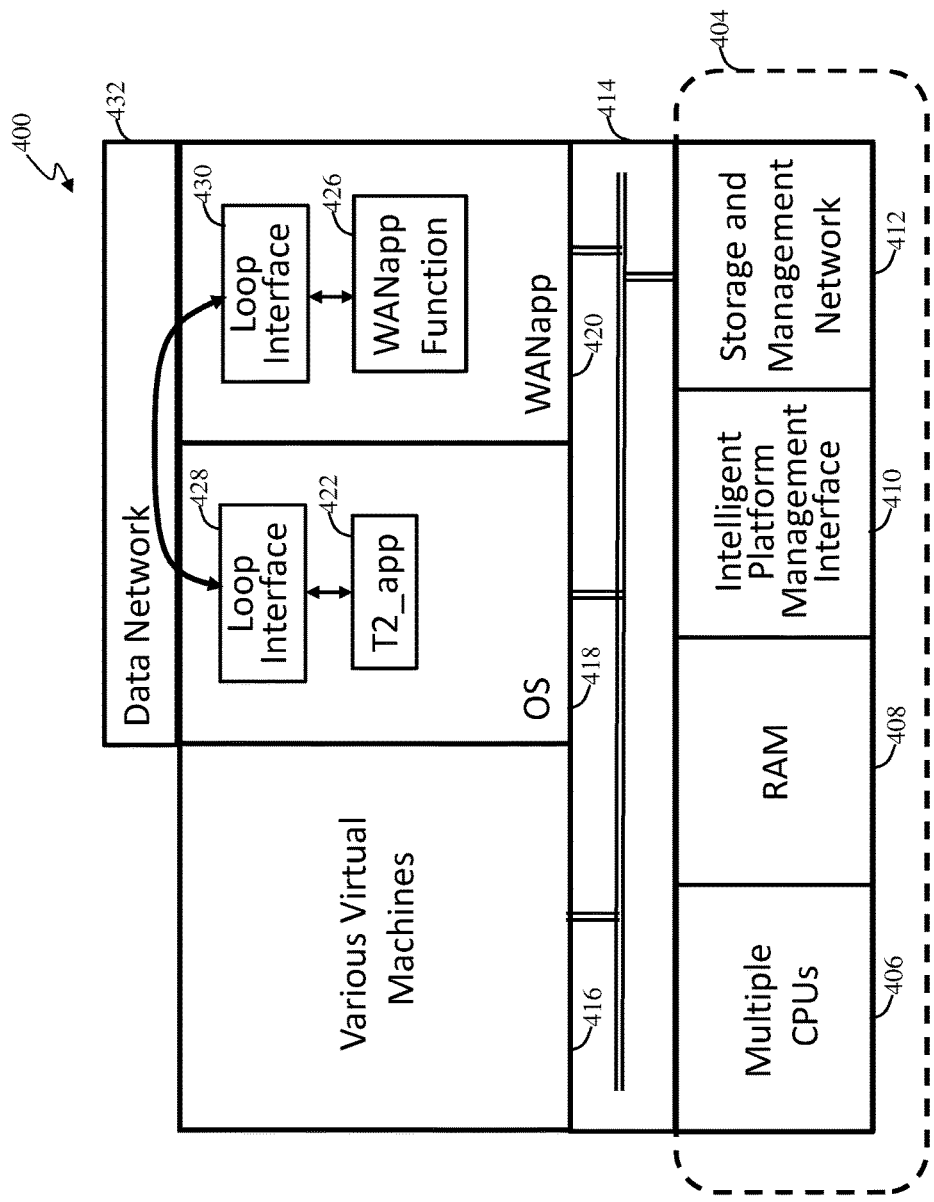
FIG. 4 illustrates a system view of an adaptive private network appliance architecture for accessing selectable applications to provide selectable WAN optimization techniques in accordance with an embodiment of the present invention.

FIG. 4 illustrates a system architecture 400 of an adaptive private network appliance architecture for accessing selectable applications to provide selectable WAN optimization techniques in accordance with an embodiment of the present invention. The system architecture 400 includes a hardware portion 404 and software portions 414, 416, 418, 420, and 432. The hardware portion 404 comprises multiple central processing units (CPUs) 406 configured in a parallel processing arrangement. Random access memory (RAM) 408 is configured as fast access memory for program storage and for fast access data storage. An intelligent platform management interface (ipmi) 410 and storage and management network 412 are hardware and software combinations that provide software configurability and access to high performance networks, peripheral ports for external devices, and APNA devices. A virtual switching infrastructure 414 provides communication between the various virtual machines 416, an operating system (OS), such as Linux 418, and at least one WANapp 420. Loop interfaces 428 and 430 provide a virtualized interface between the OS 418 and the at least one WANapp 420. The multi-functional t2_app 422 is configured in the OS 418 to transfer data packets over the loop interfaces 428 and 430 to and from the at least one WANapp function 426 as described above. In one embodiment, the loop interface uses a high speed bus in the data network 432, such as a 10 gigabyte Ethernet interface. The system architecture 400 is designed to be scalable to support additional CPUs. For example, as noted above, the multi-threaded architecture of t2_app allows platforms with multiple CPUs to spread the processing of a packet across the multiple CPUs, which allows performance of the t2_app 422 to scale as more CPUs are made available.

In one embodiment, the loop interface is a raw socket interface on all platforms. In another embodiment, the loop interface is a packet processing interface on the APN appliance for performance reasons.

To support some application specific processing, such as optimizations, the WANapp virtual machine needs to communicate with a remote WANapp virtual machine. The WANapp software has access to a list of IP addresses of remote devices that the user configures for use with this signaling channel. If a remote WANapp device is being used with a virtual WAN, then this IP address is an address of the virtual WAN VIP on the remote device. Such VIPs could be on the LAN or WAN side of the virtual WAN machine. The WANapp software then sends TCP traffic on a WANapp_signaling_channel_port to these VIPs. This traffic could be received through a conduit or unencapsulated through a trusted WAN link. When the t2_app 422 receives this traffic, the t2_app 422 recognizes that the destination IP is for one of its VIPs and that the TCP source or destination port is WANapp_signaling_channel_port. So the t2_app 422 does a network address translation (NAT) and forwards the traffic to the local WANapp device through the WANapp loop interface. If the t2_app 422 receives this traffic from an untrusted WAN link then the traffic is discarded. In another embodiment, the virtual WAN (VM) allows signaling channel connection origination from a local WANapp on any port. The VM still only allows the signaling channel connection originations from a remote WANapp on the WANapp_signaling_channel_port as before. Signaling channel connections initiated from a remote host still must arrive on the correct port number. When a signaling channel TCP connection is initiated from the local WANapp, on a same server in another VM, the source IP address is changed using a NAT to a virtual IP (VIP) address from the destination service obtained with a route lookup. The subsequent packets originating from the WANapp for this connection use only this VIP address. When a signaling channel connection is originated from a remote WANapp to the local WANapp, the destination address used needs to be a valid VIP for the service. The t2_app 422 saves this VIP in a signaling channel connection table and processes a NAT of the destination IP to be the IP of the local WANapp device as configured. The subsequent packets originating from the local WANapp for this connection use this saved VIP as the source IP after a NAT. When a signaling channel connection is closed, the connection entry is removed.

While the present invention has been disclosed in the context of various aspects of presently preferred embodiments, it will be recognized that the invention may be suitably applied to other environments consistent with the claims which follow.

We claim:

1. A method for accessing an application to provide selectable wide area network (WAN) specific processing within a WAN ingress processing pipeline, the method comprising:

receiving a packet from a local area network (LAN) in a WAN ingress processing pipeline of an adaptive private network (APN);

identifying the received packet as one to be separately processed by a redirected application that provides different processing than standard ingress processing;

redirecting packet processing flow from an identified point in the WAN ingress processing pipeline to the redirected application for application specific processing of the received packet in response to the packet being identified as the one to be separately processed; and returning the separately processed packet from the redirected application to a point in the standard ingress processing following the identified point and after completing the separate processing.

2. The method of claim 1 further comprising:
transferring the received packet over a virtualized interface between an APN program and the selected application.

3. The method of claim 1, wherein the redirected application is a program application that is separate from WAN ingress programs which operate the WAN ingress processing pipeline and, wherein the redirected application is downloaded to an APN appliance containing the WAN ingress programs.

4. The method of claim 1, wherein WAN ingress programs, which operate the WAN ingress processing pipeline in an APN appliance, forward traffic over a separate connection to a hardware device, separate from the APN appliance, for the application specific processing of the received packet.

5. The method of claim 1, wherein WAN ingress programs, which operate the WAN ingress processing pipeline in an APN appliance, forward traffic to a virtual machine in the APN appliance for the application specific processing of the received packet.

6. The method of claim 1 further comprising:
creating an application specific table which contains information that is used to identifying the received packet is to be separately processed by the redirected application;
storing original information on the received packet in a hash table, upon receiving the packet by the redirected application;
processing the received packet by the redirected application; and
restoring the original information from the hash table to the separately processed packet on return to the standard ingress processing.

7. The method of claim 1 further comprising:
determining a layer 2 (L2) forwarding method is to be used;
changing the destination media access control (MAC) address to direct the packet to the redirected application on a loop interface; and
applying a selected algorithm as directed by the redirected application to create the separately processed packet.

8. The method of claim 1 further comprising:
determining a generic routing encapsulation (GRE) protocol is to be used;
utilizing GRE to encapsulate the packet, forward the GRE packet to the redirected application on a loop interface, and to decapsulate the GRE packet to create a received packet;
applying a selected algorithm to the received packet as directed by the redirected application to create an optimized packet; and
utilizing GRE to encapsulate the optimized packet, returning the GRE optimized packet, and to decapsulate the GRE optimized packet to create the separately processed packet.

9. The method of claim 1, wherein the redirected application applies a specified encryption algorithm on the packet to create an encrypted packet as the separately processed packet.

10. The method of claim 1, wherein the redirected application applies a specified compression algorithm on the packet to create a compressed packet as the separately processed packet.

11. A method for accessing selectable applications to provide selectable wide area network (WAN) specific processing within a WAN egress processing pipeline, the method comprising:
receiving a packet from a wide area network (WAN) in a WAN egress processing pipeline of an adaptive private network (APN);
identifying the received packet is as one to be separately processed by a redirected application that provides different processing than standard egress processing;
redirecting packet processing flow from an identified point in the WAN egress processing pipeline to the redirected application for application specific processing of the received packet in response to the packet being identified as the one to be separately processed; and
returning the separately processed packet from the redirected application to a point in the standard egress processing following the identified point and after completing the separate processing.

12. The method of claim 11 further comprising:
transferring the received packet over a virtualized interface between an APN program and the redirected application.

13. The method of claim 11, wherein the redirected application is a program application that is separate from WAN egress programs which operate the WAN egress processing pipeline and, wherein the redirected application is downloaded to an APN appliance containing the WAN egress programs.

14. The method of claim 11, wherein WAN egress programs, which operate the WAN egress processing pipeline in an APN appliance, forward traffic over a separate connection to a hardware device, separate from the APN appliance, for the application specific processing of the received packet.

15. The method of claim 11, wherein WAN egress programs, which operate the WAN egress processing pipeline in an APN appliance, forward traffic to a virtual machine in the APN appliance for the application specific processing of the received packet.

16. The method of claim 11 further comprising:
creating an application specific table which contains information that is used to identify the received packet is to be separately processed by the redirected application;
storing original information on the received packet in a hash table, upon receiving the packet by the redirected application;
separately processing the received packet by the redirected application; and
restoring the original information from the hash table to the separately processed packet on return to the standard ingress processing.

17. The method of claim 11 further comprising:
determining a layer two (L2) forwarding method is to be used;
changing the destination media access control (MAC) address to direct the packet to the redirected application on a loop interface; and
applying a selected algorithm as directed by the redirected application to create the separately processed packet.

18. The method of claim 11 further comprising:
determining a generic routing encapsulation (GRE) protocol is to be used;

utilizing GRE to encapsulate the packet, forward the GRE packet to the redirected application on a loop interface, and to decapsulate the GRE packet to create a received packet;

applying a selected algorithm to the received packet as directed by the redirected application to create an optimized packet; and utilizing GRE to encapsulate the optimized packet, returning the GRE optimized packet, and to decapsulate the GRE optimized packet to create the separately processed packet.

19. The method of claim 11, wherein the redirected application applies a specified encryption algorithm on the packet to create an encrypted packet as the separately processed packet.

20. The method of claim 11, wherein the redirected application applies a specified compression algorithm on the packet to create a compressed packet as the separately processed packet.

21. A computer readable non-transitory medium storing a computer program which causes a computer system to perform a method for accessing an application to provide selectable wide area network (WAN) specific processing within a WAN ingress processing pipeline, the method comprising:

receiving a packet from a local area network (LAN) in a WAN ingress processing pipeline of an adaptive private network (APN);

identifying the received packet as one to be separately processed by a redirected application that provides different processing than standard ingress processing;

redirecting packet processing flow from an identified point in the WAN ingress processing pipeline to the redirected application for application specific processing of the received packet in response to the packet being identified as the one to be separately processed; and returning the separately processed packet from the redirected application to a point in the standard ingress processing following the identified point and after completing the separate processing.

22. The computer readable non-transitory medium method of claim 21, wherein the redirected application is a program application that is separate from WAN ingress programs which operate the WAN ingress processing pipeline and, wherein the redirected application is downloaded to an APN appliance containing the WAN ingress programs.

23. The computer readable non-transitory medium method of claim 21, wherein WAN ingress programs, which operate the WAN ingress processing pipeline in an APN appliance, forward traffic over a separate connection to a hardware device, separate from the APN appliance, for the application specific processing of the received packet.

24. The computer readable non-transitory medium method of claim 21, wherein WAN ingress programs, which operate the WAN ingress processing pipeline in an APN appliance, forward traffic to a virtual machine in the APN appliance for the application specific processing of the received packet.

* * * * *